United States Patent
Resnick et al.

(10) Patent No.: US 12,250,955 B2
(45) Date of Patent: Mar. 18, 2025

(54) PORTION CONTROL SYSTEM FOR FOOD PRODUCTS DISPENSED FROM FROZEN BEVERAGE AND SOFT-SERVE ICE CREAM EQUIPMENT

(71) Applicant: Forte Supply LLC, Loveland, CO (US)

(72) Inventors: Jeffrey D. Resnick, Dallas, TX (US); Tyler Hawker, Timnath, CO (US)

(73) Assignee: Forte Supply LLC, Loveland, CO (US)

( * ) Notice: Subject to any disclaimer, the term of this patent is extended or adjusted under 35 U.S.C. 154(b) by 148 days.

(21) Appl. No.: 18/198,906

(22) Filed: May 18, 2023

(65) Prior Publication Data
US 2023/0413851 A1    Dec. 28, 2023

Related U.S. Application Data

(63) Continuation-in-part of application No. 17/846,653, filed on Jun. 22, 2022.

(51) Int. Cl.
*F25D 31/00* (2006.01)
*A23G 9/04* (2006.01)
(Continued)

(52) U.S. Cl.
CPC .............. *A23G 9/228* (2013.01); *A23G 9/045* (2013.01); *A23G 9/12* (2013.01); *A23G 9/224* (2013.01);
(Continued)

(58) Field of Classification Search
CPC . A23G 9/045; A23G 9/20; A23G 9/22; A23G 9/224; A23G 9/228; A23G 9/28; A23G 9/281
See application file for complete search history.

(56) References Cited

U.S. PATENT DOCUMENTS 3,608,780 A * 9/1971 Nevans ............... A23G 9/28
222/73
2008/0073376 A1* 3/2008 Gist ................... B67D 1/0043
222/145.5
(Continued)

OTHER PUBLICATIONS

Queue definition: Merriam-Webster Dictionary retrieved Dec. 5, 2024 from https://www.merriam-webster.com/dictionary/queue.*

*Primary Examiner* — Jerry-Daryl Fletcher
*Assistant Examiner* — Daniel C Comings
(74) *Attorney, Agent, or Firm* — H. Brock Kolls

(57) ABSTRACT

The present invention relates to a portion control system for food products dispensed from frozen beverage equipment and soft-serve ice cream equipment. The system, injects a food product into a mixing cylinder and chills the food product to a predetermined frozen malleable consistency. When a portion-controlled dispense amount volume indicating volume of the food product to dispense is received a dispense time is determined based on a dispense amount volume and current values of dispense condition variables. If the auger motor is initially 'off' a surge dispense amount volume is first determined and dispensed, the auger motor started, and the remainder dispense time and dispense amount volume are determined and dispensed. If the auger motor is initially 'on' a dispense time is determined. Dispense time is determined by interpolating between dispense table records that comprise dispense times, dispense amount volumes, and dispense condition variables.

22 Claims, 15 Drawing Sheets

(51) Int. Cl.
*A23G 9/12* (2006.01)
*A23G 9/22* (2006.01)
*A23G 9/28* (2006.01)
*G01F 13/00* (2006.01)

(52) U.S. Cl.
CPC ............. *A23G 9/28* (2013.01); *G01F 13/005* (2013.01); *G01F 13/006* (2013.01); *F25D 31/002* (2013.01)

(56) References Cited

U.S. PATENT DOCUMENTS

2014/0261873 A1* 9/2014 Mohammed ............. A23G 9/28
 221/221
2022/0030906 A1* 2/2022 Springer ............. B01F 27/9212

* cited by examiner

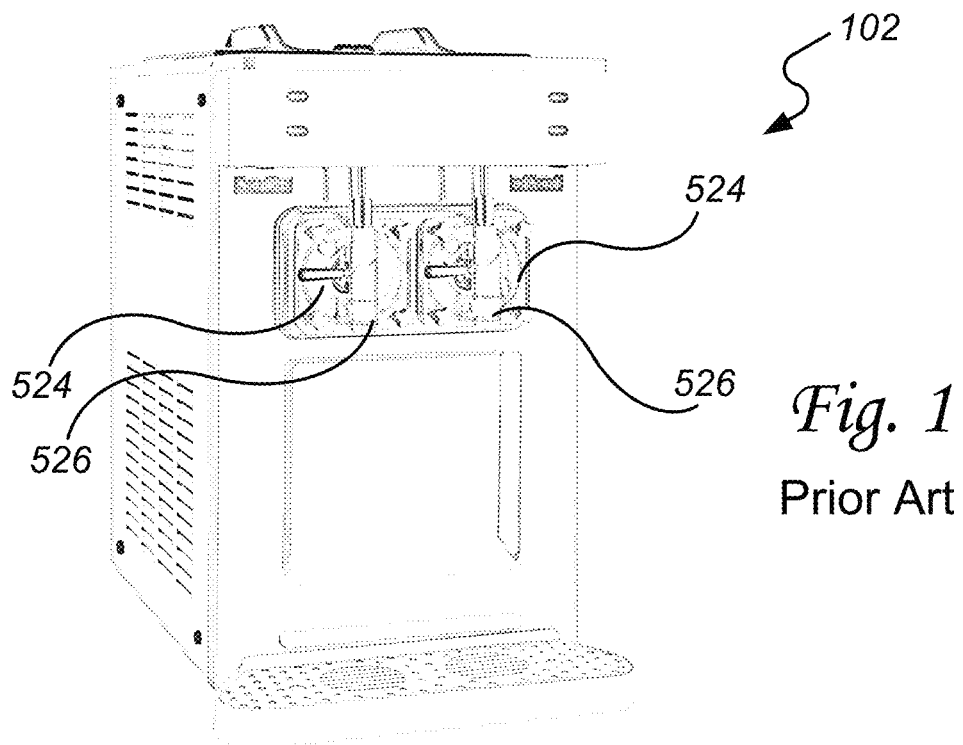
Fig. 1
Prior Art
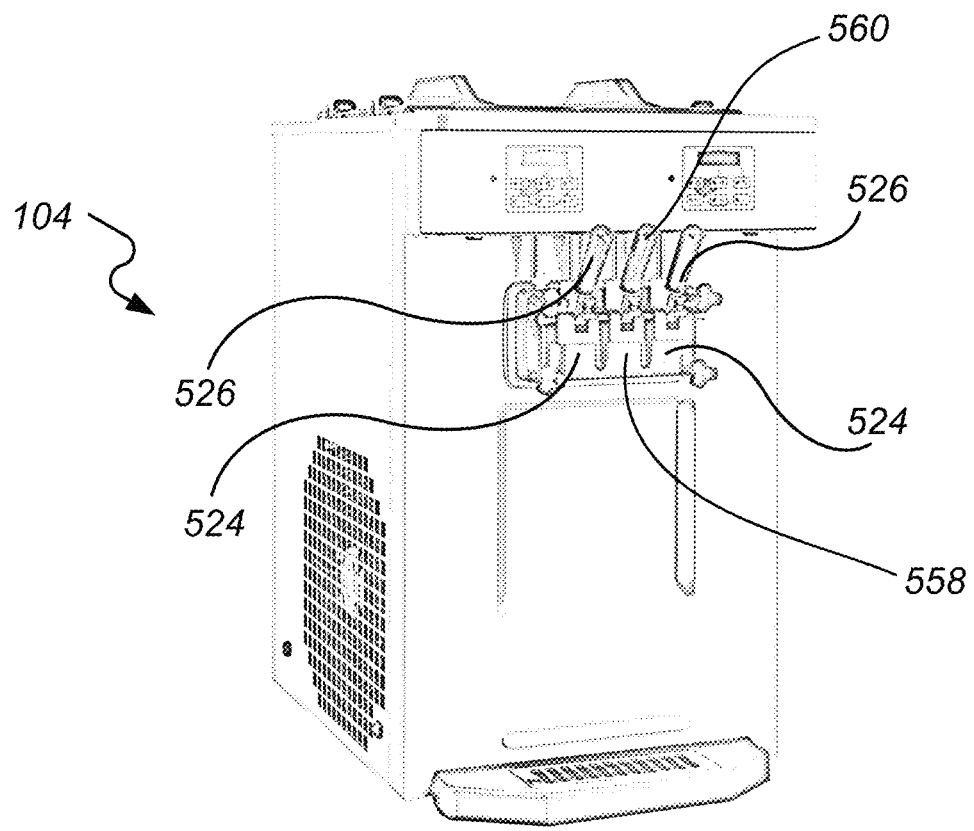

Dispense Table Records

| Record Identifier | 1 | 2 | 3 | 4 | | N |
|---|---|---|---|---|---|---|
| Dispense Time (sec) | 1.03 | 0.86 | 1.2 | 1.36 | | .91 |
| Dispense Amount Volume (oz) | 3 | 3 | 3 | 3 | | 3 |
| Dispense Rate (oz/sec) | 2.9 | 3.5 | 2.5 | 2.2 | | 3.3 |
| Auger Motor RPM Speed | 120 | 120 | 120 | 90 | | 120 |
| Product Temperature (F) | 22 | 22 | 18 | 20 | | 20 |
| Mixing Cylinder Pressure (psi) | 5.1 | 5.1 | 5.1 | 5.1 | ... | 8.6 |
| Viscosity Of Food Product (A) | 2.5 | 2.3 | 2.7 | 2.5 | | 2.7 |
| Dispense Valve Aperature (in) | 0.5 | 0.5 | 0.5 | 0.55 | | 0.6 |
| Geometry Of The Auger | A | A | B | B | | C |

PORTION CONTROL SYSTEM FOR FOOD PRODUCTS DISPENSED FROM FROZEN BEVERAGE AND SOFT-SERVE ICE CREAM EQUIPMENT

CROSS-REFERENCE TO RELATED APPLICATIONS

This application contains subject matter which is related to the subject matter of the following co-pending application. The below-listed application is hereby incorporated herein by reference in its entirety:

This is a U.S. non-provisional application that claims the benefit of a U.S. provisional application Ser. No. 17/846,653, inventor Jeffery D. Resnick et al., entitled "AUTOMATIC VISCOSITY CONTROL SYSTEM FOR FOOD PRODUCTS DISPENSED FROM FROZEN BEVERAGE AND SOFT-SERVE ICE CREAM EQUIPMENT", filed Jun. 22, 2022.

TECHNICAL FIELD OF THE INVENTION

This invention relates to a portion-control system for food products dispensed from frozen beverages and soft-serve ice cream equipment. The portion-control system automatically dispenses a predetermined amount of frozen beverage or soft-serve ice cream based on determining a dispense time. The dispense time is determined by interpolating between dispense table records that comprise dispense times, dispense amount volumes, and dispense condition variables.

BACKGROUND OF THE INVENTION

Before our invention, a shortcoming of frozen beverage and soft-serve ice cream machines was that a service person had to manually set most of the control features such as temperature and spring tension for product freeze-up control. In this regard, if the product began to freeze solid a spring lever tripped a mechanical switch causing the refrigeration system to turn 'OFF' allowing the product to warm and thaw. As a result, product viscosity, consistency, and product quality vary widely even between consecutive dispenses. When dispensing a product sometimes the product is too frozen and difficult to dispense other times too warm and runny.

Another shortcoming is that even when a frozen beverage or soft-serve ice cream machine was manually set to deliver products not too frozen and not too runny something as simple as ambient temperature or humidity changes can cause the consistency of the product to change requiring more manual intervention adjusting the machine setting to improve product quality.

Another shortcoming of frozen beverage and soft-serve ice cream machines is that absent the ability to automatically control the viscosity of the product, quick-serve restaurants, and other establishments are unable to reliably and repeatedly automatically dispense exact product volumes such as small, medium, and larger size portions with consistent and acceptable accuracy.

The present invention addresses these and other shortcomings by providing automatic viscosity control and portion control systems and methods for frozen beverage and soft-serve ice cream machines. For these reasons and shortcomings as well as other reasons and shortcomings there is a long-felt need that gives rise to the present invention.

SUMMARY OF THE INVENTION

The shortcomings of the prior art are overcome and additional advantages are provided through the provision of a portion control system for food products dispensed from frozen beverage equipment and soft-serve ice cream equipment. The system comprises a mixing cylinder which comprises at least one auger, at least one product inlet, and at least one dispense valve. The system further comprises an auger motor that is interconnected with the auger. The auger is positioned inside the mixing cylinder and rotates at an auger motor RPM speed. The system further comprises a control system which comprises a microcontroller, a memory, a temperature sensor, a pressure sensor, and a motor sensor. The temperature sensor is operationally related to the mixing cylinder and measures a product temperature of the food product inside the mixing cylinder. The pressure sensor is operationally related to the mixing cylinder and measures pressure inside the mixing cylinder. The motor sensor is operationally related to the auger motor and measures an amperage draw or a torque of the auger motor resultant from the resistance of rotating the auger through the food product.

The memory is encoded with instructions that when executed by the microcontroller perform the steps of injecting a food product into the mixing cylinder through the product inlet and chilling the food product to a predetermined frozen malleable consistency, and receiving a portion-controlled dispense amount volume indicating volume of the food product to dispense.

If initially the auger motor RPM speed is zero the system determines a dispense time and a dispense amount volume based on current values of a plurality of dispense condition variables by interpolating between plurality of a dispense table record, the dispense table record comprises a dispense time, a dispense amount, and the auger motor RPM across a range of values of the plurality of dispense condition variables where the auger motor RPM is zero, the dispense amount volume is a surge amount volume. The system then opens the dispense valve for the dispense time, allowing the surge amount volume of the food product, in the predetermined frozen malleable consistency, to be dispensed in portion control manner. The system then determines the dispense time and the dispense amount volume. The dispense time is determined based on current values of the plurality of dispense condition variables by interpolating between plurality of the dispense table record. The dispense amount volume is equal to the portion-controlled dispense amount volume minus the surge dispense amount volume. The auger motor is then started rotating. And, the system opens the dispense valve for the dispense time, allowing the dispense amount volume of the food product, in the predetermined frozen malleable consistency, to be dispensed in portion control manner.

If initially the auger motor RPM speed is greater than zero the system determines the dispense time and the dispense amount volume. The dispense time is determined based on current values of the plurality of dispense condition variables by interpolating between plurality of the dispense table record. The dispense amount volume is equal to the portion-controlled dispense amount volume. And the system then opens the dispense valve for the dispense time, allowing the dispense amount volume of the food product, in the predetermined frozen malleable consistency, to be dispensed in a portion control manner.

Additional shortcomings of the prior art are overcome and additional advantages are provided through the provision of a portion control method for food products dispensed from frozen beverage equipment and soft-serve ice cream equipment. The portion control method comprises the steps of injecting a food product into a mixing cylinder and chilling the food product to a predetermined frozen malleable consistency. The mixing cylinder comprises at least one of an auger, at least one of a product inlet, and at least one of a dispense valve, an auger motor is interconnected with the auger, a control system comprising a temperature sensor, a pressure sensor, and a motor sensor. The temperature sensor is operationally related to the mixing cylinder. The temperature sensor measures the temperature of the food product inside the mixing cylinder. The pressure sensor is operationally related to the mixing cylinder and measures pressure inside the mixing cylinder. The auger is positioned inside the mixing cylinder and rotates at an auger motor RPM speed. The motor sensor is operationally related to the auger motor. The motor sensor measures an amperage draw or a torque of the auger motor resultant from resistance of rotating the auger through the food product.

The method continues by, receiving a portion-controlled dispense amount volume indicating volume of the food product to dispense.

If initially, the auger motor RPM speed is zero then the method continues by determining a dispense time and a dispense amount volume. The dispense time is determined based on current values of a plurality of dispense condition variables by interpolating between plurality of a dispense table record. The dispense table record comprises a dispense time, a dispense amount, and the auger motor RPM across a range of values of the plurality of dispense condition variables where the auger motor RPM is zero. The dispense amount volume is a surge amount of volume. The method continues by opening the dispense valve for the dispense time, allowing the surge amount of volume of the food product, in the predetermined frozen malleable consistency, to be dispensed in portion control manner. The method then determines the dispense time and the dispense amount volume. The dispense time is determined based on current values of the plurality of dispense condition variables by interpolating between plurality of the dispense table record, the dispense amount volume is equal to the portion-controlled dispense amount volume minus the surge dispense amount volume. The method then starts the auger motor rotating, and opens the dispense valve for the dispense time, allowing the dispense amount volume of the food product, in the predetermined frozen malleable consistency, to be dispensed in portion control manner.

If initially, the auger motor RPM speed is greater than zero, the method determines the dispense time and the dispense amount volume. The dispense time is determined based on current values of the plurality of dispense condition variables by interpolating between plurality of the dispense table record. The dispense amount volume is equal to the portion-controlled dispense amount volume. The method then opens the dispense valve for the dispense time, allowing the dispense amount volume of the food product, in the predetermined frozen malleable consistency, to be dispensed in portion control manner.

Additional shortcomings of the prior art are overcome and additional advantages are provided through the provision of a portion control method for food products dispensed from frozen beverage equipment and soft-serve ice cream equipment. The portion control method trains the portion control system by way of the steps of injecting a food product into a mixing cylinder and chilling the food product to a predetermined frozen malleable consistency. The mixing cylinder comprises at least one of an auger, at least one of a product inlet, and at least one of a dispense valve, an auger motor is interconnected with the auger. A control system comprises a memory, a temperature sensor, a pressure sensor, and a motor sensor, the temperature sensor is operationally related to the mixing cylinder. The temperature sensor measures the temperature of the food product inside the mixing cylinder. The pressure sensor is operationally related to the mixing cylinder and measures pressure inside the mixing cylinder. The auger is positioned inside the mixing cylinder and rotates at an auger motor RPM speed. The motor sensor is operationally related to the auger motor. The motor sensor measures an amperage draw or a torque of the auger motor resultant from resistance of rotating the auger through the food product.

The method continues by varying at least one of a plurality of dispense condition variables. The plurality of dispense condition variables comprise a dispense time, a dispense amount volume, a food product viscosity, a mixing cylinder pressure, a dispense valve aperture size, a geometry of the auger, and an auger motor RPM speed. The method then dispenses the food product in the predetermined frozen malleable consistency form. The method then determines a volume of food product dispensed and a training dispense time in which the volume of food product was dispensed. The method then stores in at least one of the dispense table record, in the memory or accessible on a remote data processing resource, the training dispense time duration as the dispense time, the volume of food product dispensed as the dispense amount volume, the product temperature, the mixing cylinder pressure, the auger motor RPM speed, and a food product viscosity based in part on an amperage draw or a torque of the auger motor, wherein the dispense table record is updated.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 illustrates examples of frozen beverage equipment and soft-serve ice cream equipment;

Figure 2:
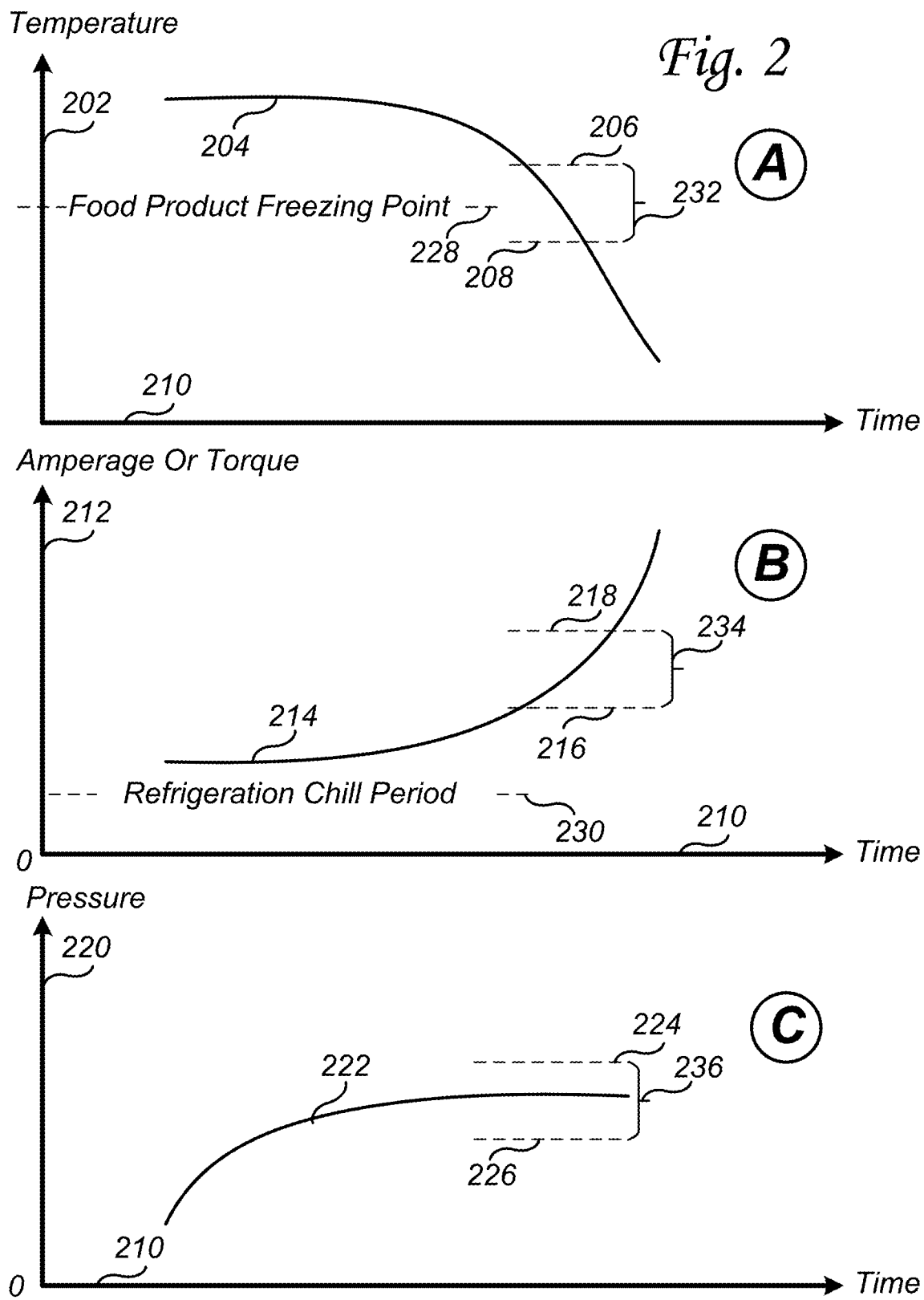
FIG. 2 illustrates one example of temperature, pressure, and amperage or torque charts.

The detailed description explains the preferred embodiments of the invention, together with advantages and features, by way of example with reference to the drawings.

DETAILED DESCRIPTION OF THE INVENTION

Turning now to the drawings in greater detail, it will be seen that in FIG. 1 there are illustrated examples of frozen beverage equipment and soft-serve ice cream equipment. The frozen beverage equipment 102 and soft-serve ice cream equipment 104 are commonly found in restaurants, quick-serve restaurants, convenience stores, and numerous other locations.

In an exemplary embodiment, each frozen beverage equipment 102 and soft-serve ice cream equipment 104 can comprise one or more separate mixing cylinders 524 that contain a food product 302. The mixing cylinders 524 receive a food portion 306 from a food portion supply 562 and a gas portion 304 that form the food product 302. Selectively, in some exemplary embodiment, a water portion 308 can also be supplied. Each of the food portion 306, gas portion 304, and water portion 308 are ratiometrically injected into the mixing cylinder 524 so that the percentage proportion of each to the other is maintained. The food product 306 is chilled in the mixing cylinder 524 and dispensed through a dispense valve 526. Such food product 302 dispensing can be automated and portion-controlled or effectuated by user 402 or customer 404 manually.

The term "ratiometrically" or "ratiometric", in the present invention, is intended to mean two or more ingredients, portions, or other contents being mixed in a continuous predefined ratio regardless of the total volume being mixed forming a ratiometric mixture, such as of the food product 302. Such portions can be the food portion 306, the gas portion 304, water, or other portions. Each ingredient, portion, or other content is mixed in a predefined ratio with respect to each of the other ingredients, portions, or other contents, as may be required and/or desired in a particular embodiment. In this regard, any volume of the final mixture comprising the ingredients, portions, or other contents can be produced. Such gas portions can be air, carbon dioxide, nitrogen, or other gas portion.

The frozen beverage equipment 102 and soft-serve ice cream equipment 104 can be configured with any number of mixing cylinders comprising the same or different kinds of food portions 306, gas portions 304, and thus food products 302. Illustrated in FIG. 1, as an example and not a limitation, frozen beverage equipment 102 is shown with two separate mixing cylinders 524 and dispense valves 526. Soft-serve ice cream equipment 104 is shown with two separate mixing cylinders 524 and dispense valves 526, and one additional dispense valve 560 that combines food products from both mixing cylinders 526 into a single dispense stream 558. This configuration is common where one mixing cylinder comprises, as an example, chocolate ice cream, the other mixing cylinder comprises, as an example, vanilla ice cream, and the additional dispense valve 560 dispenses 558 a mixture of chocolate and vanilla ice cream.

In operation, the food product 302 is injected into mixing cylinder 524 as a food portion 306, a gas portion 304, and selectively a water portion 308 and then chilled to a predetermined frozen malleable consistency. A user 402 or customer 404 can then dispense the food product 302 by way of a dispense valve 526. The gas portion 304 can be air, carbon dioxide, nitrogen, or other types and kinds of gases, as may be required and/or desired in a particular embodiment. In an exemplary embodiment, gases such as carbon dioxide, and other gasses can be injected into the mixing cylinder at a sufficient pressure to cause the gas to dissolve into the food portion 306 resulting in the food product 302 becoming carbonate in the case of dissolved carbon dioxide, or otherwise imbibed, or infused with the gas.

Referring to FIG. 2, there is illustrated one example of temperature reference 'A', amperage or torque charts reference 'B', and a pressure chart reference 'C'. An advantage, of the present invention, is that in an exemplary embodiment, automatic viscosity control of the food product 302 is achieved by enabling and disabling the refrigeration system 568 from chilling the food product 306 in the mixing cylinder 524 based on the electrical amperage current draw or the torque 214 of the auger motor 576, or both the temperature 204 of the food product 302 and the electrical amperage current draw or the torque 214 of the auger motor 576. In this regard, resultant from the refrigeration system 568, as the temperature 204 of the food product 302 decreases the food product 302 begins to chill into a predetermined frozen malleable consistency. This transition to a predetermined frozen malleable consistency increases the viscosity of the food product 302. The increased viscosity of the food product 306 in turn makes it more difficult for the motor 502 to rotate the auger 522 through the frozen malleable food product 302 increasing the amperage draw and the torque 214 of the auger motor 576. In an exemplary embodiment, by controlling the refrigeration system 568, 'ON' and 'OFF', based on at least the amperage draw or torque 214 of the auger motor 576 the viscosity of the food product 306 in the mixing cylinder 524 can be automatically maintained. For disclosure purposes, with reference to FIG. 2 reference 'B', the chart can represent either amperage draw 214 or the torque 214 and can be referred to as amperage draw or the torque 214

In an exemplary embodiment, in operation, an automatic viscosity control system for food products 302 dispensed from frozen beverage equipment 102 and soft-serve ice cream equipment 104 can comprise a mixing cylinder 524 comprising at least one of an auger 522, at least one of a product inlet 566 through which a food portion 306 is injected into the mixing cylinder 524, and at least one gas inlet 564 through which a gas portion 304 is injected into the mixing cylinder 524. A food product 302 comprises the food portion 306, and the gas portion 304. An auger motor 576 is interconnected with the auger 522. The auger is positioned inside the mixing cylinder 524 and turns stirring the food product 302.

A control system 500 comprises a microcontroller 502, a memory 504, and a motor sensor 530 (amperage draw) or 528 (torque). The motor sensor 528/530 is operationally related to the auger motor 576. The motor sensor 528/530 measures an amperage draw 528 or a torque 530 of the auger motor 576 resultant from the resistance of rotating the auger 522 through the food product 302. For disclosure purposes, the motor sensor can be one or both of the amperage meter 530 or torque monitor 528 referred to as motor sensor 528/530.

A refrigeration system 568 comprises a compressor 536. The refrigeration system 568 is configured to chill, to a predetermined frozen malleable consistency, the food product 302 inside the mixing cylinder 524.

The memory 504 can be encoded with instructions that when executed by the microcontroller 502 transition between the steps of starting or speeding up the compressor 536 when the amperage draw or the torque 214 of the auger motor 576 is below a predetermined high motor performance setting 218. And, slowing or stopping the compressor 536 when the amperage draw or the torque of the auger motor 576 is between 234 a predetermined low motor performance setting 216, and the predetermined high motor performance setting 218. In this regard, FIG. 2, reference 'B', illustrates an amperage draw or the torque curve 214 electrical current amperages or torque in inch-pounds (or other units) versus time 210.

In another exemplary embodiment, the control system 500 can comprise a temperature sensor 542. The temperature sensor 542 is operationally related to the microcontroller 502 and the mixing cylinder 524. The temperature sensor 542 measures the temperature of the food product 302 inside the mixing cylinder 524. The memory 504 can be encoded with instructions that when executed by the microcontroller 502 perform the steps of starting or speeding up the compressor 536 when the temperature 204 of the food product 302 is above a predetermined high-temperature setting 206. And, slowing or stopping the compressor 536 when temperature 204 of the food product 302 is between a predetermined low-temperature setting 208 and the predetermined high-temperature setting 206 range 232, and the amperage draw or the torque of the auger motor 576 is between a predetermined low motor performance setting 216 and the predetermined high motor performance setting 218 range 234.

In this regard, FIG. 2, reference 'A', illustrates a food product 302 chilling temperature curve 204 plotted as temperature 202 versus time 210. A predetermined food product 302 temperature range 232 is selected between 232 a predetermined low-temperature setting 208 and the predetermined high-temperature setting 206. Such food product 302 predetermined low-temperature setting 208 and the predetermined high-temperature setting 206 can be selected in the range 228 of where the food product 302 freezes plus or minus a few degrees.

Food product 302 viscosity plays an important role in the quality of the frozen beverage or soft-serve ice cream. If the food product 302 viscosity is too low it can make the food product 302 inconsistent, soft, and/or runny, and if the food product 302 viscosity is too high can make the food product 302 thick, or even frozen to the point that it can't easily be dispensed from the dispense valve 526.

In operation, several factors can influence food product 302 freezing and as such optimal food product 302 viscosity in a predetermined frozen malleable form. Such factors can include the amount of chill time at or near the food product 302 freezing point, the rotational speed of the auger 522, ambient conditions such as humidity, external temperature, and other ambient conditions, and the composition of the food product 302 such as the type, kind, and/or amount of sugar content, and other factors can influence the progression of freezing and the viscosity of the food product 302 as it freezes.

An advantage, in the present invention, is that in addition to closely monitoring and controlling the temperature of the food product 302, the viscosity of the food product is also closely monitored and controlled. In this regard, FIG. 2, reference 'B', illustrates an auger motor 576 amperage draw or torque curve 214 plotted as electrical amperage or torque 212 versus time 210.

In operation, as the food product 302 chills and begins to freeze the viscosity of the food product 302 increases as it thickens, transitioning the food product 302 into a predetermined frozen malleable form. As the food product 302 thickens as it is chilled the viscosity increases applying more force to the auger 522 which in turn causes the auger motor 576 to draw more electrical current amperage and the torque 214 on the auger motor 576 increases too. For motor control systems that can determine torque, torque determination or measurements can be used along with or instead of using electrical amperage draw determination or measurements. One example of a motor control system that determines torque can be a variable frequency drive (VFD) that can be used as the auger motor 576. Other types and kinds of auger motors can also be used, as may be required and/or desired in a particular embodiment.

In another exemplary embodiment, torque can be measured mechanically by having a force of the food product 302 mixed in the mixing cylinder 524 applied to a lever that increasingly displaces as the food product 302 transitions to a predetermined frozen malleable consistency. The amount of displacement of the lever can be measured by the torque monitor 528 automatically electronically to determine a relative torque reading that can then be used in the methods of the present invention.

To achieve optimal food product 302 viscosity, a predetermined low motor performance setting 216 and a predetermined high motor performance setting 218 range 234 can be predetermined and set. The control system 500 can then disable the refrigeration system 568 when the amperage draw or torque 214 reaches the predetermined high motor performance setting 218 allowing the food product 302 to warm reducing the food product 302 viscosity. Similarly, if the amperage draw or torque 214 reaches the predetermined low motor performance setting 216 and the refrigeration system 568 is in the disabled state then the control system 500 can enable the refrigeration system 568 to chill the food product 302 which in turn increases the viscosity of the food product 302.

An advantage, in the present invention, is that automate viscosity control of the food product 302 can be controlled by controlling the temperature around the food product 302 freezing point 228 between a predetermined low-temperature setting 208 and a predetermined high-temperature setting 206 range 232, and between 234 a predetermined low motor performance setting 216 and a predetermined high motor performance setting 218. The result is that the present invention delivers the food product 302 in an optimum frozen malleable form at a consistent viscosity automatically without a technician having to change equipment configurations manually.

In an exemplary embodiment, an alarm condition can be communicated by way of a display 506 or data communicated with a remote data processing resource 604 when a predetermined refrigeration chill period 230 elapses and the food product 302 has not sufficiently increased in viscosity to cause an increase in the amperage or torque 214 to reach the desired range 234. The control system 500 comprises the display 506 and the display 506 is operationally related to the microcontroller 502. In operation, the predetermined refrigeration chill period 230 is the amount of time allotted for the food product 302 to reach a predetermined frozen malleable consistency. Failure to achieve the desired predetermined frozen malleable consistency of the food product 302 in the allotted predetermined refrigeration chill period 230 can indicate equipment failures such as a refrigeration system 568 failure or other equipment failures.

In another exemplary embodiment, referring to FIG. 2 reference 'C' chart, pressure 222 within the mixing cylinder 524 can be determined over time 210. The pressure 222 is resultant from a gas portion 304 and a food portion 306 being initially injected in a predetermined ratio into the mixing cylinder 524. Food product 302 comprises the gas portion 304 and the food portion 306. The pressure 222 can also increase as the food product 302 transitions to a predetermined frozen malleable form.

In this regard, a product pump 552 is operationally related to the microcontroller 502 and interconnected between the product inlet 566 and the supply of the food portion 306 stored in package 562 such as a bag-in-the-box type or kind of packaging, or other types and kinds of packaging as may be required and/or desired in a particular embodiment. A gas metering device 548 is operationally related to the microcontroller 502 and interconnected with a gas inlet 564. The mixing cylinder 524 further comprises the gas inlet 564, and the product inlet 566. A pressure sensor 520 is operationally related to the microcontroller 502. The pressure sensor 520 is configured to measure a food product 302 pressure inside the mixing cylinder 524.

In operation, the memory 504 is encoded with instructions that when executed by the microcontroller 502 perform the step of filling the mixing cylinder, by way of the gas metering device and the product pump, with a predetermined ratio of the gas portion to the food portion until the food product pressure is between 236 a predetermined low-pressure setting and a predetermined high-pressure setting.

In another exemplary embodiment, a portion control system for food products 302 dispensed from frozen beverage equipment 102 and soft-serve ice cream equipment 104 can comprise a mixing cylinder 524 that comprises at least one auger 522, at least one product inlet 574, and at least one dispense valve 526. An auger motor can be interconnected with the auger 522. The auger 522 is positioned inside the mixing cylinder 524 and turns through and stirs the food product 302.

A control system comprises a microcontroller 502, a memory 504, a temperature sensor 542, and a motor sensor 528/530. The temperature sensor is operationally related to the mixing cylinder 524. The temperature sensor measures the temperature 204 of the food product 302 inside the mixing cylinder 524. The motor sensor 528/530 is operationally related to the auger motor 576. The motor sensor 528/530 measures an amperage draw or a torque 214 of the auger motor 576 resultant from the resistance of rotating the auger 522 through the food product 302.

The memory 504 is encoded with instructions that when executed by the microcontroller 502 perform the steps of injecting a food product 302 into the mixing cylinder 524 and chilling the food product 302 into a predetermined frozen malleable consistency. Receiving a portion-controlled dispense amount volume indicating the volume of the food product 302 to dispense. Determining a product temperature 204 of the food product by way of the temperature sensor 542. Determining the amperage draw or the torque 214 of the auger motor 522 by way of the motor sensor 528/530. Determining by querying a dispense time from the memory 504 or a remote data processing resource 604 based on the portion-controlled dispense amount volume. The product temperature 204, and the amperage draw or the torque 214. And, opening the dispense valve 526 for the dispense time, allowing the food product 302, in a predetermined frozen malleable consistency to be dispensed in a portion-control manner.

In an exemplary embodiment, the step of receiving referenced above the portion-controlled dispense amount volume can be effectuated by a data communication from a point-of-sale device, a quick-serve restaurant data processing device, a customer 404 or the user 402 initiated data communication from a digital communication device, a remote data communication from the remote data processing resource, manual data entry by the user at the portion control system, or by other methods or techniques as may be required and/or desired in a particular embodiment.

In an exemplary embodiment, the step of determining by querying reference above the dispense time is effectuated by a lookup table or a database encoded in the memory 504, the lookup table and the database correlates a plurality of the dispense time based on a plurality of the portion-controlled dispense amount volume, a plurality of the product temperature, a plurality of the amperage draw or the torque, and other factors, as may be required and/or desired in a particular embodiment.

In an exemplary embodiment, a product pump 552 is operationally related to the microcontroller 502 and interconnected between the product inlet 566 and the supply of the food portion 306. A gas metering device 548 is operationally related to the microcontroller 502 and interconnected with a gas inlet 564. The mixing cylinder 524 further comprises the gas inlet 564, and the product inlet 566. A pressure sensor 520 is operationally related to the microcontroller 502. The pressure sensor 520 is configured to measure a food product pressure inside the mixing cylinder 524. The memory 504 can be encoded with instructions that when executed by the microcontroller 502 perform the step of filling the mixing cylinder, by way of the gas metering device and the product pump, with a predetermined ratio of the gas portion to the food portion until the food product pressure is between a predetermined low-pressure setting and a predetermined high-pressure setting.

When the dispense valve 526 is first opened the food product pressure forces a surge of food product 302 also called overrun to dispense out of the dispense valve 526. When the food product pressure drops it is then the auger 522 that pushes the food product 302 out of the dispense valve 526.

In another exemplary embodiment, a pressure sensor 520 is operationally related to the microcontroller 502. The memory 504 is encoded with instructions that when executed by the microcontroller 502 perform the steps of determining, by way of the pressure sensor 520, a food product pressure 222 inside the mixing chamber 524. Determining, based on the food product pressure 222, a surge dispense amount of food product 302 also called overrun will initially be dispensed resultant from the food product pressure 222 when the dispense valve 526 is opened. And, adjusting the portion-controlled dispense amount volume desired, for purposes of determining the dispense time, by subtracting from the portion-controlled dispense amount volume the surge dispense amount.

In an exemplary embodiment, the food product pressure 222 is sufficient to force a surge dispense amount of food product 302 out the dispense valve 526 when opened. Once the food product pressure 222 drops resultant from the surge dispense amount egress through the dispense valve 526 it is the auger 522 that pushes the remaining desired food portion through the dispense valve 526. In a portion-controlled application, the surge dispense amount should be subtracted from the portion-controlled dispense amount volume before the dispense time is determined to better ensure food product 302 dispense accuracy.

As an example and not a limitation, at a predetermined temperature 204, amperage draw or torque 214, and food product pressure 222 the surge dispense amount is one ounce of food product 302, and the food product dispense flow rate is two ounces per second. Therefore if the desired portion-controlled dispense amount volume is nine ounces then the adjusted portion-controlled dispense amount volume is nine ounces minus the surge dispense amount or nine ounces minus one ounce which equals eight ounces. The dispense time then becomes the adjusted portion-controlled dispense amount volume divided by the food product dispense flow rate or eight ounces divide by two ounces per second which equals four seconds. The dispense time is then four seconds. In a plurality of embodiments, as temperature 204, amperage draw or torque 214, and food product pressure 222 change so will the surge dispense amount, and the food product dispense flow rate. In operation, an accessible lookup table or database in memory 504 or on a remote data processing resource 604 can correlate variables that change such as temperature 204, amperage draw of torque 214, food product pressure 222, the surge dispense amount, and the food product dispense flow rate, and other variables with the desired portion-controlled dispense amount to determine a dispense time to achieve an accurate portion-controlled food product 302 dispense.

In an exemplary embodiment, the auger motor 576 can be stopped and thus the auger 522 stopped during the surge period, this allows the surge amount to be predictably dispensed without the aid of the auger 522. Once the surge amount has been dispensed the auger 522 by way of the auger motor 576 can be restarted and it is then the action of the auger 522 that causes the food product 302 to be dispensed.

In an exemplary embodiment, during dispense of the food product 302, the auger motor 576 speed can be reduced proportionally as the temperature of the food product increases, the amperage draw decreases, or the torque decreases. In this regard, as the viscosity of the food product 302 decreases (thins) the auger motor speed 502 can be decreased to maintain a constant flow rate of the food product 302 during dispense. In an exemplary embodiment, the auger motor 576 can a variable frequency drive (VFD) motor, or other type or kind of motor as may be required and/or desired in a particular embodiment.

Figure 3:
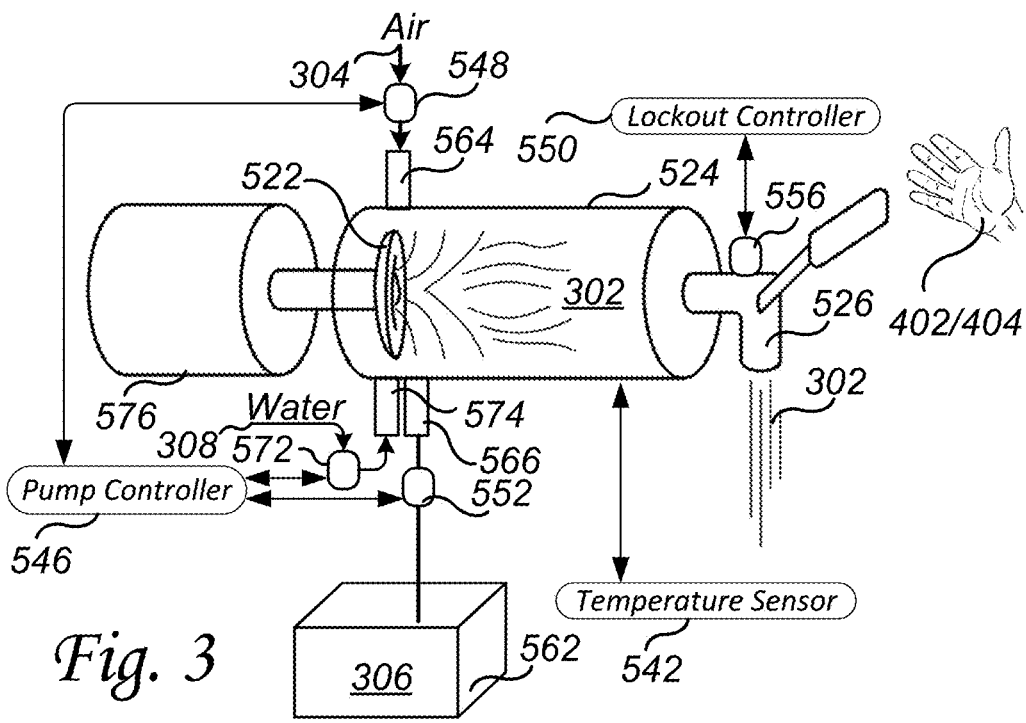
FIG. 3 illustrates one example of a system block diagram for frozen beverage equipment or soft-serve ice cream equipment using air as the gas portion.

Referring to FIG. 3, there is illustrated one example of a system block diagram for frozen beverage equipment 102 or a soft-serve ice cream equipment 104 using air 304 as the gas portion. In an exemplary embodiment, a mixing cylinder 524 comprises at least one auger 522, at least one product inlet 566 through which a food portion 306 is injected into the mixing cylinder 524, and at least one gas inlet 564 through which a gas portion 304 such as air, in this exemplary embodiment, is injected into the mixing cylinder 52. A food product 302 comprises the food portion 306, and the gas portion 304.

The gas inlet 564 can be interconnected with a pump/air tube 548. The pump/air tube 548 supplies air to the mixing cylinder 524 at a predetermined airflow rate so that the ratio of food portion 306, gas portion 304, the air in this exemplary embodiment, and optionally water portion 308 (in embodiments when needed) can be preset, ratiometrically mixed, and maintained each time the mixing cylinder 524 needs to replenish the food product, such as in an initial fill, and after a dispense.

Such air injection, by way of pump/air tube 548, can be under pump conditions wherein the air 304 is mechanically or otherwise forced into the mixing cylinder 524 up to the desired pressure, or the air 304 can be drawn into the mixing cylinder 524 absent a pump through an air tube as the food product 302 is dispensed. The diameter of the air tube can be selected, larger or smaller diameter, to effectuate the ratio of air to food portion 306, and optionally water portion 308, as may be required and/or desired in a particular embodiment.

In operation, it is the ratio of the air 304 to the food portion 306 and optionally to the water portion 308 that is important to preset and maintain as the ratio impacts the food product 302 quality. In other embodiments, the radiometric mixture of the air 304, food portion 306, and optionally the water portion 308 can be preset such that the ratio is maintained each time the mixing cylinder 524 is refilled thus maintaining product quality.

The product inlet 566 can be interconnected with a pump 552 and the pump 552 can be interconnected with a food portion 306 such that the pump 552 can pump the food portion 306 into the mixing cylinder 524. When energized, the pump 552 supplies the food portion 306 to the mixing cylinder 524 at a predetermined flow rate so that the ratio of food portion 306, gas portion 304, and water portion 308 (in embodiments when needed) can be preset, ratiometrically mixed, and maintained each time the mixing cylinder 524 needs to replenish the food product, such as in an initial fill, and after a dispense.

In an exemplary embodiment, a water inlet 574 can be interconnected with a pump 572 and the pump 572 can be interconnected with a water supply 308 such that the pump 572 can pump water 308 into the mixing cylinder 542. When energized, the pump 552 supplies the water 308 to the mixing cylinder 524 at a predetermined flow rate so that the ratio of water 308, food portion 306, and gas portion 304 can be preset, ratiometrically mixed, and maintained each time the mixing cylinder 524 needs to replenish the food product, such as in an initial fill, and after a dispense. In an exemplary embodiment, when water is needed such as in diluting food portion 306 syrup, other for other needs it can be supplied and mixed in ration with the food portion 306 and the gas portion 304.

In an exemplary embodiment, the pumps 548, 552, and 572 can each be interconnected with and operationally related to the pump controller 546. The pump controller 546 can independently control each of the pumps 548, 552, and 548. Such pumps 548, 552, and 572 types and kinds can be selected such that accurate metering of the respective gas portion 304, food portion 306, and when needed water portion 572 for recipe mixing purposes can be effectuated.

An auger motor 576 is interconnected with the auger 522. The auger 522 is positioned inside the mixing cylinder 524. The auger 522 can be a fan-style configuration, blade-style configuration, paddle-style configuration, spiral-spatula configuration, or other types and kinds of styles and configurations as may be required and/or desired in a particular embodiment.

A dispensing valve 526 can be operated automatically by way of the control 500 or manually by way of a user 402. When the dispense valve 526 is opened the food product 302 is dispensed from the mixing cylinder 524. The dispensed food product 302 is replaced by an equivalent portion of the food portion 306, the gas portion 304, and selectively the water portion 308.

A dispense lock 556 is operationally related to a lockout controller 550. The lockout controller 550 is operationally related to the microcontroller 502.

The control system 500 comprises the microcontroller 502, the pump controller 546, the temperature sensor 542, and the lockout controller 550.

In an automated viscosity control exemplary embodiment, a dispense lock 556 is operationally related to the microcontroller 502. The memory 504 is encoded with instructions that when executed by the microcontroller 502 transition between the steps of unlocking the dispense lock 556, allowing a user 402 or a customer 404 to dispense the food product 302 when the temperature of the food product 302 is between the predetermined low-temperature setting 208 and the predetermined high-temperature setting 206, and the amperage draw or the torque 214 of the auger motor 576 is between a predetermined low motor performance setting 216 and the predetermined high motor performance setting 218. And, locking the dispense lock 556, preventing the user 402 or the customer 404 from dispensing the food product 302, when the temperature of the food product 302 is below the predetermined low-temperature setting 208 or above the predetermined high-temperature setting 206, or the amperage draw or the torque 214 of the auger motor 576 is below the predetermined low motor performance setting 216 or above the predetermined high motor performance setting 218. The dispense lock 556 can comprise a solenoid, or other mechanisms as may be required and/or desired in a particular embodiment.

In a portion-controlled exemplary embodiment, a dispense lock 556 is operationally related to the microcontroller 502. The memory 504 is encoded with instructions that when executed by the microcontroller 502 transition between the steps of unlocking the dispense lock 556, allowing the food product 302 to be dispensed, when the temperature 204 of the food product 302 is between a predetermined low-temperature setting 208 and a predetermined high-temperature setting 206, and the amperage draw or the torque 214 of the auger motor 576 is between a predetermined low motor performance setting 216 and a predetermined high motor performance setting 218. And, locking the dispense lock 556 and queuing the portion-controlled dispense amount volume, preventing the food product 302 from being dispensed, when the temperature of the food product 302 is below the predetermined low-temperature setting 208 or above the predetermined high-temperature setting 206, or the amperage draw or the torque 214 of the auger motor 576 is below the predetermined low motor performance setting 216 or above the predetermined high motor performance setting 218. The dispense lock 556 can comprise a solenoid, or other mechanisms as may be required and/or desired in a particular embodiment.

In the present invention "ideal consistency" is related to food product 302 viscosity and intended to mean the predetermined frozen malleable consistency of the food product 302 which can be easily dispensed from the dispense valve 526 yet frozen enough to be non-runny and user 402 and/or customer 404 desirable for consumption. In this regard, the predetermined frozen malleable consistency can be selected by the user configuring the frozen beverage equipment 102 and soft-serve ice cream equipment 104.

In operation, the memory 504 can be encoded with instructions that when executed by the microcontroller perform the steps of allowing the user doing equipment configuration to change the ratio of the food portion 306 with respect to the gas or air 304 portions. Then at least one of the predetermined low-temperature setting, the predetermined high-temperature setting, the predetermined low motor performance setting, or the predetermined high motor performance setting can be adjusted to maintain the predetermined frozen malleable consistency. In this manner, the ideal consistency of the food product 302 also called the predetermined frozen malleable consistency can be maintained even when the ratio of the food portion 306 with respect to the gas portion or air 304 changes. Noting that desirable mouth feel and other desirable customer consumption benefits of the frozen beverage or soft-serve ice cream can be obtained by changing the ratio of the food portion 306 with respect to the gas or air portion 304.

As an example, and not a limitation, a food product 302 with a food portion 306 and a gas or air portion 304 ratios of 60/40, 50/50, 40/60, or other ratios will all have different mouth feels and different customer consumption benefits at the predetermined frozen malleable consistency which can also be called the ideal consistency. To maintain the predetermined frozen malleable consistency across various food portion 304 and a gas portion 306 ratio changes at least one of the predetermined low-temperature setting, the predetermined high-temperature setting, the predetermined low motor performance setting, or the predetermined high motor performance setting can be adjusted. The present invention will then automatically maintain the desired predetermined frozen malleable consistency for the ratio of food portion 306 to gas or air portion 304.

An advantage, in the present invention, is that food product 302 ideal consistency can be achieved by maintaining the food product 302 between a temperature range defined by a predetermined low-temperature setting 208 and a predetermined high-temperature setting 206, and between a motor performance range defined by a predetermined low motor performance setting 216 and a predetermined high motor performance setting 218. Such food product 302 ideal consistency is automatically maintained by holding the food product 302 within the predetermined ranges of temperature 206/208 and motor performance 216/218 and such ranges can be adjusted manually or automatically in response to variances such as environmental conditions, equipment variances, food product 302 type or kind changes or variance, and other variances, as may be required and/or desired in a particular embodiment.

In an exemplary embodiment, in the present invention, by automatically maintaining the ideal consistency of the food product 302 even with variances in operating conditions the ability to determine a dispense time to dispense a desired portion-controlled dispense amount volume is effectuated. To increase the accuracy of the desired portion-controlled dispense amount volume a surge dispense amount must be taken into consideration. Since the ideal consistency can be relied on, the present invention uses food product pressure 222 to determine and control the surge dispense amount.

In this regard, the surge dispense amount of the food product 302 occurs during the initial dispense when the dispense valve 526 is first opened. With the temperature range 232 and motor performance range 234 established creating the desired food product 30 ideal consistency, the food product pressure 222 can be adjusted by establishing a food product 302 pressure range 236 defined by a predetermined low-pressure setting 226 and a predetermined high-pressure setting 224. Once established the food product pressure 222 is maintained within the range resulting in a predictable and known surge dispense amount that can be used to adjust the dispense time so that the desired portion-controlled dispense amount volume is more accurately achieved.

In operation, while the food product 302 ideal consistency is maintained between the predetermined ranges of temperature 232 and motor performance range 234 the surge dispense amount can be adjustably changed by changing the food product pressure range 236 and then repeatably maintained when the food product pressure 222, within the mixing chamber 524, is maintained between the predetermined low-pressure setting 226 and the predetermined high-pressure setting 224. Such food product pressure 222 is controlled by the amount of the food portion 306 and gas portion 304 that is injected into the mixing chamber 524. Changing the food product pressure 222 predictably changes the surge dispense amount.

In combination, the temperature range 232 and motor performance range 234 automatically control the viscosity of the food product 302 creating the ideal consistency while the pressure range 236 controls the amount of the surge dispense amount that is dispensed when the dispense valve 526 is first opened. Together, maintaining ranges in temperature 232, motor performance range 234, and food product pressure range 236 effectuate the ability to dispense the food product 302 in a repeatably accurate portion-controlled manner.

Figure 4:
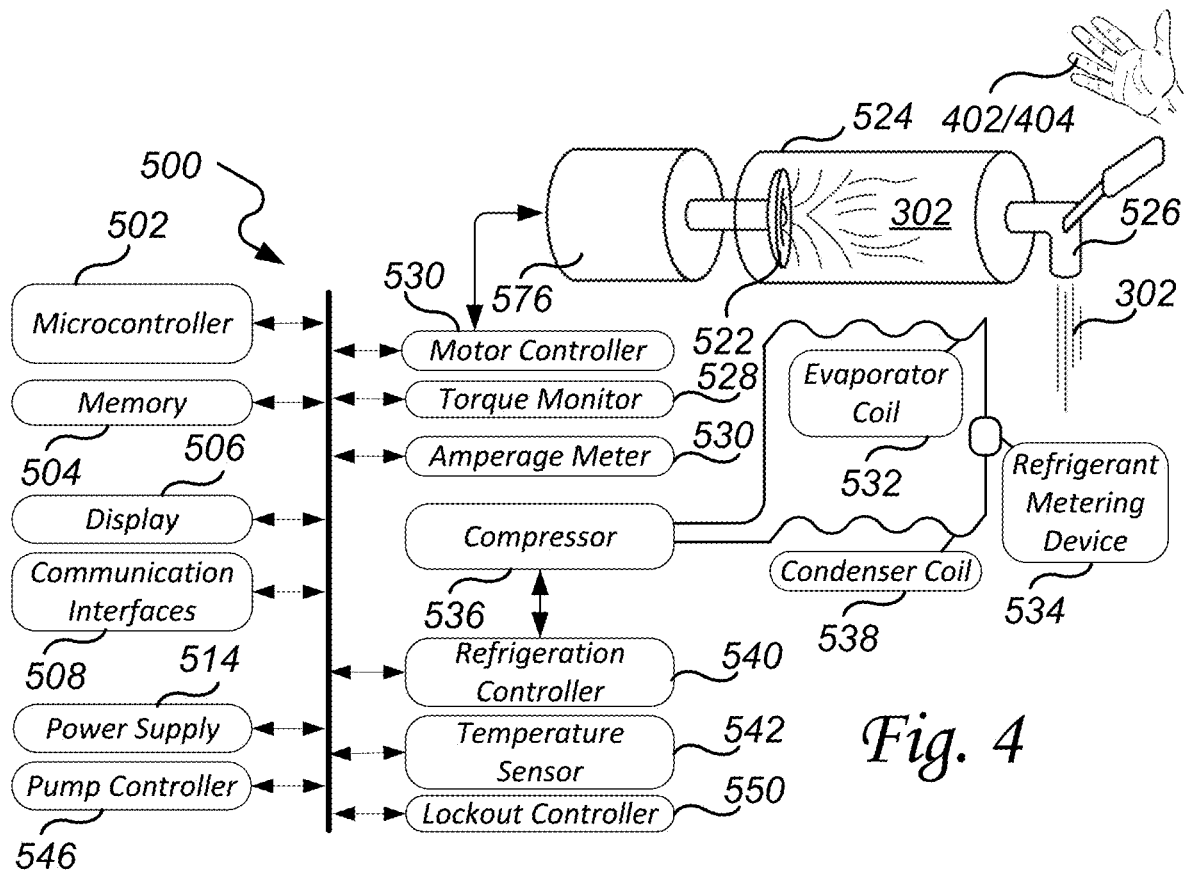
FIG. 4 illustrates one example of a control system.

Referring to FIG. 4, there is illustrated one example of a control system 500. In an exemplary embodiment, control system 500 can be integrated into and control frozen beverage equipment 102 and soft-serve ice cream equipment 104. In addition, control system 500 can be a web-enabled control system.

The term "web-enabled" or "web-enabled control system" or "web-enabled control system 500" in the present invention is intended to mean an Internet-of-things device. In this regard, a device that is capable of connecting a physical device such as the frozen beverage equipment 102 and soft-serve ice cream equipment 104 to the digital world. Stated differently, web-enabling is equipping a device with the necessary electronics to be monitored, controlled, and data communicate locally and remotely with other data communicating devices. Such other data communicating devices can be smartphones, tablets, laptops, mobile communication devices, other web-enabled devices, servers, and similar devices.

In addition, such data communicating devices 606 can data communicate with remote data processing resources 604 and utilize data storage resources 602. Laptops, smartphones, smartwatches, tablets, desktop computers, servers, mobile communication devices, and other types and kinds of data communication devices can all be data communicating devices 606.

In operation, a user 402, or a customer 404 can use data communicating devices 606 to interact with the frozen beverage equipment 102 and soft-serve ice cream equipment 104. In this regard, a user 402 can be a person who operates, maintains, cleans, configures, repairs, and performs other functions on or with the frozen beverage equipment 102 or soft-serve ice cream equipment 104. A customer 404 can be a person who self-serve dispenses food product 302. The digital experience and interaction with the frozen beverage equipment 102 and soft-serve ice cream equipment 104 by the user 402, and customer 404 can be different and suited for their various roles and requirements, as may be required and/or desired in a particular embodiment.

Such data processing resources can be a server or other types and kinds of data processing resources. Furthermore, data communicating devices 606, remote data processing resources 604, data storage resources 602, and other types and kinds of data communicating devices can data communicate over a global network 700. The Internet is a global network 700.

In an exemplary embodiment, the frozen beverage equipment 102 and soft-serve ice cream equipment 104 can be equipped with a web-enabled control system 500. Such a web-enabled control system can comprise a microcontroller 502 which is operationally related to a plurality of communication interfaces 508, a power supply 514, a pump controller 546, a display 506, motor controller 530, a memory 504, a torque monitor 528, an amperage meter 530, a refrigeration controller 540, a temperature sensor 542, and a lockout controller 550.

The microcontroller 502 can be INTEL, ZILOG, MICROCHIP, AMD, ARM, and/or other types or kinds of microcontrollers.

The memory 614 can be combinations of RAM, ROM, flash, hard drives, solid-state drives, USB flash drives, and/or other types and kinds of memory.

The display 610 can be an LCD, OLED, LED, as well as have touch input capabilities and/or other types and kinds of displays and user inputs as may be required and/or desired in a particular embodiment.

The communication interface 508 can be LAN, WAN, USB, Ethernet, RS232, RS485, serial, WiFi, 802.11abgn and similar, 2G 3G 4G 5G compatible, Bluetooth, TCP, UDP, Mesh Network, Zigbee, Pico Network, LORAN, and/or other types and kinds of communication interfaces and protocols.

In an exemplary embodiment, the communication interface 508 is operationally related to the microcontroller 502. The control system by way of the communication interface 508 data communicates with the remote data processing resource 604, data communication devices 606, remote service provider 406 networks, quick-server restaurant networks, other frozen beverage equipment 102 and soft-serve ice cream equipment 104, in a local area network environment or a wide area network environment across a global network 700 in a wired or wireless manner as may be required and or desired in a particular embodiment. The Internet is a global network 700.

The power supply 514 can be AC, DC, battery, solar, and/or other types and kinds of power supplies.

The pump controller 546 can be a relay, MOSFET, or other types and kinds of controlling devices.

The motor controller 530 can be a relay, MOSFET, variable frequency drive controller (VFD), or other types and kinds of motor control devices.

The torque monitor 528 can be a communication interface that communicates with a motor controller such as a VFD motor controller or other motor controllers that provides information about the motor performance that includes a torque metric determination or other motor performance data such that the control system 500 can calculate the torque of the auger motor 576. In an exemplary embodiment, analog-type sensor determinations can be converted to digital values so that the microcontroller 502 can process the data. Alternatively, the microcontroller 502 can perform the analog-to-digital conversions if equipped to perform such functions.

In another exemplary embodiment, torque can be measured mechanically by having a force of the food product 302 mixed in the mixing cylinder 524 applied to a lever that increasingly displaces as the food product 302 transitions to a predetermined frozen malleable consistency. The amount of displacement of the lever can be measured by the torque monitor 528 automatically electronically to determine a relative torque reading that can then be used in the methods of the present invention.

The amperage meter 530 can be a current transformer such as a torrid coil winding having one of the auger motor electrical wires running through the center of the torrid coil, or other types and kinds of electrical current sensing techniques and/or devices. In an exemplary embodiment, analog-type sensor determinations can be converted to digital values so that the microcontroller 502 can process the data. Alternatively, the microcontroller 502 can perform the analog-to-digital conversions if equipped to perform such functions.

A refrigeration system 568 comprises the refrigeration controller 540. The refrigeration controller 540 can be a relay, MOSFET, or other types and kinds of refrigeration controlling devices. In an exemplary embodiment and better illustrated in at least FIG. 7, a compressor 536 is interconnected with and operationally related to the refrigeration controller 540. The compressor 536 circulates the refrigerant through a condenser coil 538, a refrigerant metering device 534 such as an expansion valve, and an evaporate coil 532. In operation, the refrigeration system 568 chills the food product 302 in the mixing cylinder 524 to a predetermined frozen malleable consistency. The refrigeration system 568 can use a variety of refrigerant types including for example thermoelectric such as Peltier and others, vapor-compression, non-vapor-compression, and other types and kinds of refrigeration system, as may be required and/or desired in a particular embodiment.

The temperature sensor 542 can be positioned and configured to measure the temperature of the food product 302 within the mixing cylinder 524. Such a temperature sensor 542 can be a resistive temperature (RTD), thermistor, infrared, integrated silicon-based, or other types and kinds of temperature sensors as may be required and/or desired in a particular embodiment. In an exemplary embodiment, analog-type sensor determinations can be converted to digital values so that the microcontroller 502 can process the data. Alternatively, the microcontroller 502 can perform the analog-to-digital conversions if equipped to perform such functions.

In an exemplary embodiment, a user interface comprises at least one of the following a display 506, a display 506 with touchscreen, a communication interface 508 configured to data communicate with a data communication device 606, a plurality of button input capabilities by way of the GPIO 510, or other user interfaces. The user interface is operationally related to the microcontroller 502, a user 402 or customer 404 can enter the portion-controlled dispense amount volume by way of the user interface.

Figure 5:
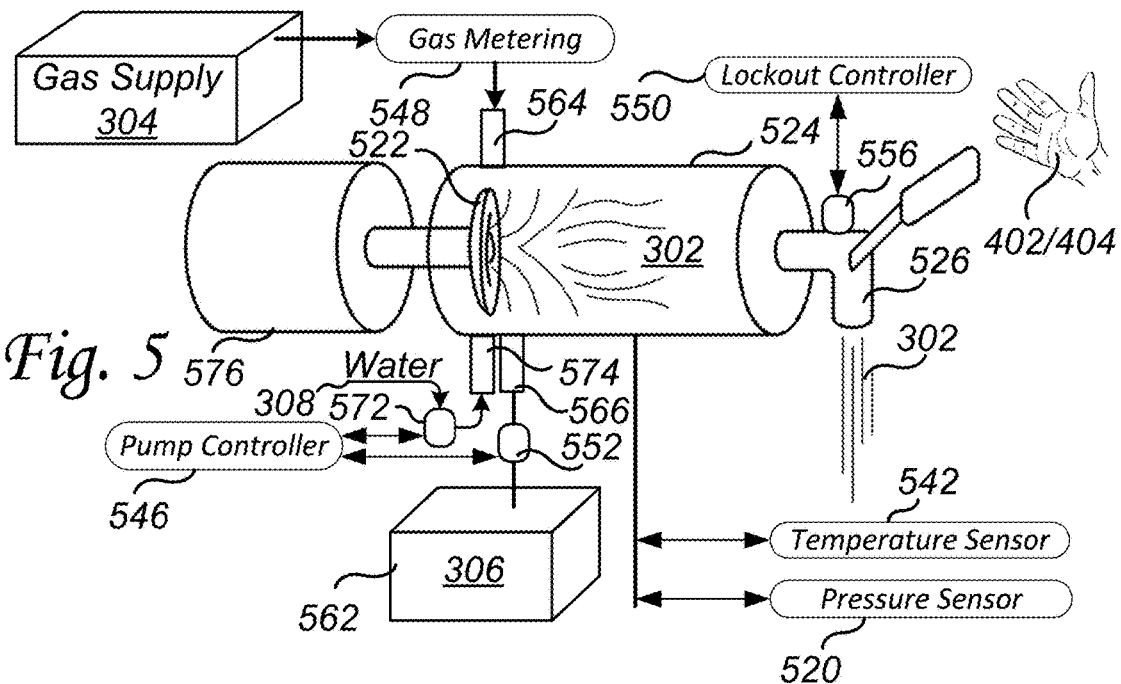
FIG. 5 illustrates one example of a system block diagram for frozen beverage equipment or soft-serve ice cream equipment configured to use a variety of gases as the gas portion.

Referring to FIG. 5, there is illustrated one example of a system block diagram for frozen beverage equipment 102 or a soft-serve ice cream equipment 104 configured to use a variety of gases as the gas portion 304. With reference to FIG. 5, in an exemplary embodiment, the system block diagram in FIG. 3 can be adapted to provide for varying types or kinds of the gas portion 304 in addition to air. In this regard, a gas metering device 548 can be interconnected between a gas portion 304 supply of a gas and the gas inlet 564. In operation, the gas portion can be air, carbon dioxide, nitrogen, or other types and kinds of gases, as may be required and/or desired in a particular embodiment. In an exemplary embodiment, gases such as carbon dioxide, and other gasses can be injected into the mixing cylinder 524 at a sufficient pressure to cause the gas to dissolve into the food portion resulting in the food product 324 becoming carbonate in the case of dissolved carbon dioxide, or otherwise imbibed, or infused with the gas.

With reference to FIG. 5, in an exemplary embodiment, the system block diagram in FIG. 3 can be adapted to provide for a pressure sensor 520. The pressure sensor 520 is operationally related to the microcontroller 502. The pressure sensor 520 is configured to measure the food product pressure 222 of the food product 302 inside the mixing cylinder 524.

In an exemplary embodiment, an automatic viscosity control system for food products dispensed from frozen beverage equipment and soft-serve ice cream equipment can comprise a mixing cylinder 524 which comprises at least one of an auger 522, at least one of a product inlet 566 through which a food portion 306 is injected into the mixing cylinder 524, and at least one of a gas inlet 564 through which a gas portion 304 is injected into the mixing cylinder 524.

A food product 302 comprises the food portion 306 and the gas portion 304. An auger motor 576 is interconnected with the auger 522. The auger 522 is positioned inside the mixing cylinder 524.

A control system 500 comprises a microcontroller 502, and a memory 504. A motor sensor 528/530 is operationally related to the microcontroller 502 and interconnected with the auger motor 576. The motor sensor 528/530 measures an amperage draw or a torque of the auger motor 576 resultant from the resistance of rotating the auger 522 through the food product 302. A gas metering device 548 is operationally related to the microcontroller 502 and interconnected with a gas inlet 564. The mixing cylinder 524 further comprises the gas inlet 564, and the product inlet 566. A pressure sensor 520 is operationally related to the microcontroller 502. The pressure sensor 520 is configured to measure the pressure of the food product 302 inside the mixing cylinder 524.

A refrigeration system 568 comprises a compressor 536. The compressor 536 is operationally related to the microcontroller 502 and configured to chill, into the predetermined frozen malleable consistency, the food product 302 inside the mixing cylinder 524.

The memory 504 is encoded with instructions that when executed by the microcontroller 502 perform the steps of filling the mixing cylinder 524, by way of the gas metering device 548 and the product pump 552, with a predetermined ratio of the gas portion 304 to the food portion 306 until the food product pressure 222 is between a predetermined low-pressure setting 226 and a predetermined high-pressure setting 224.

The method continues by starting or speeding up the compressor 536 when the temperature of the food product 302 is above a predetermined high-temperature setting 208 or when the amperage draw or the torque of the auger motor 576 is below a predetermined high motor performance setting 218. And, slowing or stopping the compressor 536 when the temperature of the food product 302 is between a predetermined low-temperature setting 206 and the predetermined high-temperature setting 208, and the amperage draw or the torque of the auger motor 576 is between a predetermined low motor performance setting 216 and the predetermined high motor performance setting 218.

Figure 6:
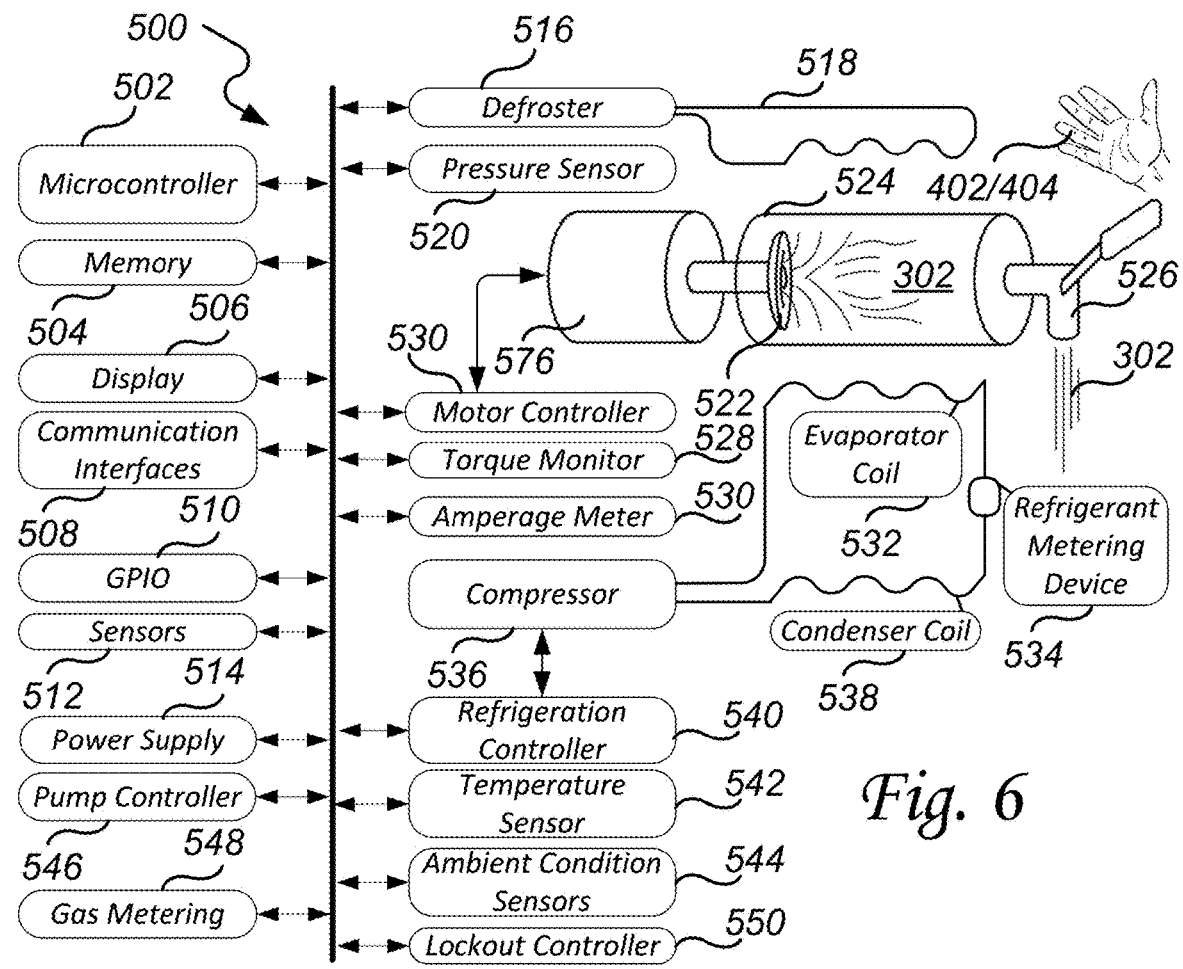
FIG. 6 illustrates one example of a control system.

Referring to FIG. 6, there is illustrated an example of a control system 500. In an exemplary embodiment, the control system 500 of FIG. 4 can be enhanced with the following features illustrated in FIG. 6.

The defrost system 516 can be resistive heat 518, thermoelectric, and/or other types and kinds of defrosting systems. In operation, the defrost system 516, as needed, can warm the mixing cylinder 524 to prevent the food product 324 from freezing into a solid mass.

The pressure sensor 520 can be diagram displacement-based, strain gauge, variable capacitance, resistive, piezoelectric, micro-electrical mechanical system (MEMS), and/or other types and kinds of pressure sensors. In an exemplary embodiment, analog-type sensor determinations can be converted to digital values so that the microcontroller 502 can process the data. Alternatively, the microcontroller 502 can perform the analog-to-digital conversions if equipped to perform such functions.

The GPIO 510 can be TTL, CMOS, transistors, buffers, relays, pushbutton, switch, and/or other types and kinds of GPIO circuits.

The sensors 512 can be PIR motion sensors, infrared, thermal, Doppler radar, ultrasonic, capacitance, touch-type, optical, Hall effect, switch, fingerprint, and other types of biometric sensors, and/or other types and kinds of sensors. In an exemplary embodiment, analog-type sensor determinations can be converted to digital values so that the microcontroller 502 can process the data. Alternatively, the microcontroller 502 can perform the analog-to-digital conversions if equipped to perform such functions.

The ambient condition sensors 544 can be temperature, moisture, humidity, sunlight, time, date, and/or other types and kinds of sensors. In an exemplary embodiment, analog-type sensor determinations can be converted to digital values so that the microcontroller 502 can process the data. Alternatively, the microcontroller 502 can perform the analog-to-digital conversions if equipped to perform such functions.

Figure 7:
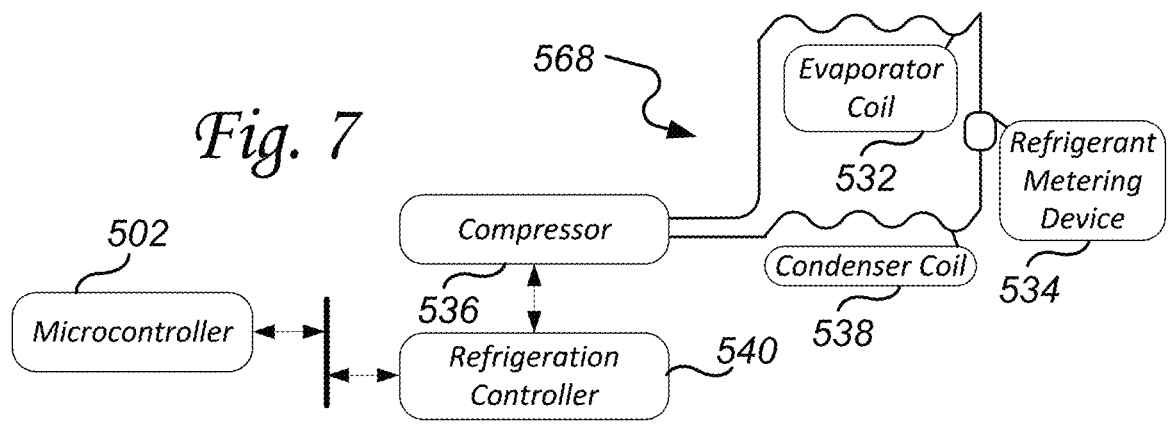
FIG. 7 illustrates one example of a refrigeration system.

Referring to FIG. 7, there is illustrated one example of a refrigeration system 568. In an exemplary embodiment, the refrigeration system 568 comprises the refrigeration controller 540. The refrigeration controller 540 can be a relay, MOSFET, or other types and kinds of refrigeration controlling devices. The refrigeration controller 540 is operationally related to the microcontroller 502. The compressor 536 is interconnected with and operationally related to the refrigeration controller 540. The compressor 536 circulates the refrigerant through a condenser coil 538, a refrigerant metering device 534 such as an expansion valve, and an evaporate coil 532. In operation, the refrigeration system 568 chills the food product 302 in the mixing cylinder 524 to a predetermined frozen malleable consistency. The refrigeration system 568 can use a variety of refrigerant types including for example thermoelectric, vapor-compression, non-vapor-compression, and other types and kinds of refrigeration system, as may be required and/or desired in a particular embodiment.

In a plurality of exemplary embodiments, the compressor 536 can be a standard conventional compressor that can be turned 'ON' and 'OFF' or a variable speed compressor that can be turned 'ON' and 'OFF' as well as have variable speed controls to allow the compressors to be operated at different rotational speeds. Such variable speed compressors, used properly, can have the benefit of lower overall energy usage requirements, as well as having other benefits. Other types and kinds of compressors can be used as well as other types and kinds of the refrigeration system 568 configurations can be effectuated, as may be required and or desired in a particular embodiment.

Figure 8:
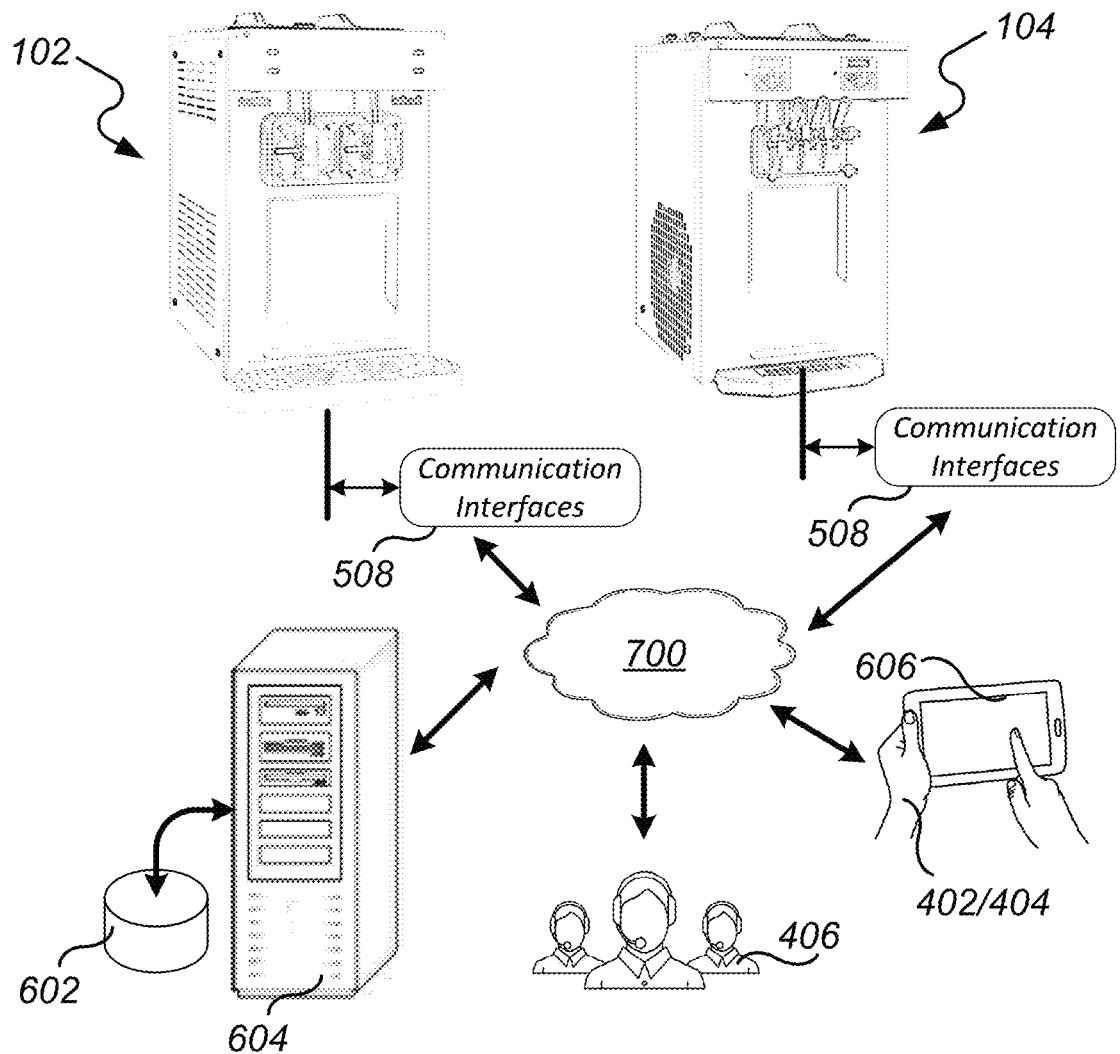
FIG. 8 illustrates one example of a global network-based system block diagram.

Referring to FIG. 8, there is illustrated one example of a global network-based system block diagram. In an exemplary embodiment, by way of control system 500 communication interface 508, frozen beverage equipment 102 and soft-serve ice cream equipment 104 can data communicate over a global network 700 with one or more remote data processing resources 604, databases 602 that are operationally related to a remote data processing resource 604, one or more data communication device 606 operated by user 402 or customer 404, and one or more remote service provider 406. The Internet is one example of a global network 700. Database 602 is operationally related to the remote data processing resource 604. In addition, there can be any number of remote data processing resources 604, and/or database 602, as well as other global network-based computing devices as may be required and/or desired in a particular embodiment.

Such data communication devices 606 can include smartphones, tablets, laptops, other web-enabled devices, mobile communication devices, and other data communication devices, as may be required and/or desired in a particular embodiment.

Such remote data processing resource 604 can be a server, network appliance, or other types and kinds of remote data processing resources, as may be required and or desired in a particular embodiment.

Such remote service provider 406 can be a technical service network, a call center, a customer service organization, an alarm/equipment service monitoring company, or other types and kinds of remote service providers.

Figure 9:
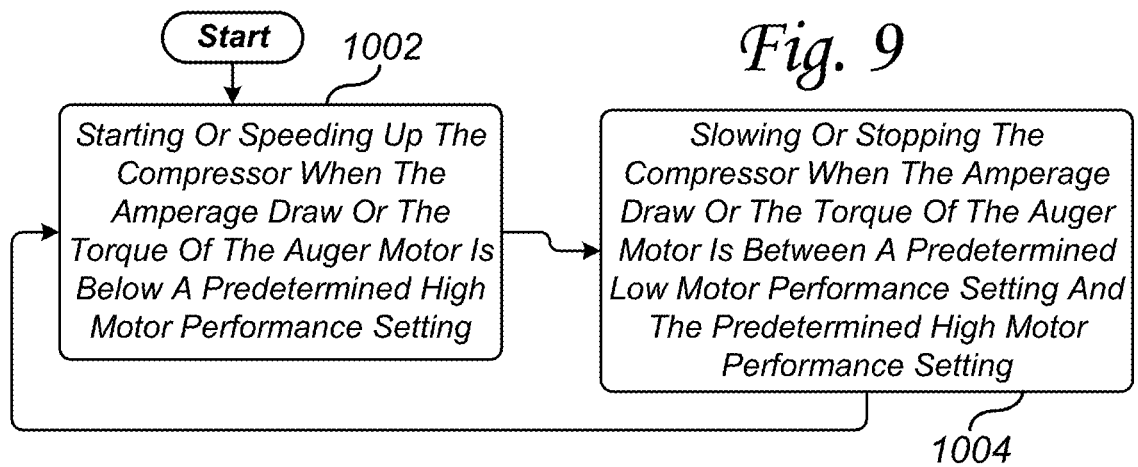
FIGS. 9-14 illustrate examples of an automatic viscosity control method for frozen food products dispensed from frozen beverage equipment and soft-serve ice cream equipment.

Referring to FIG. 9, there is illustrated one example of an automatic viscosity control method for frozen food products 302 dispensed from frozen beverage equipment 102 and soft-serve ice cream equipment 104. In an exemplary embodiment, a refrigeration system 568 can comprise a compressor 536. The refrigeration system 568 is configured to chill, into the predetermined frozen malleable consistency, the food product 302 inside the mixing cylinder 524. The memory 504 is encoded with instructions that when executed by the microcontroller 502 transitions between steps 1002 and 1004.

In step 1002, the compressor 536 is started or speeded up when the amperage draw or the torque 214 of the auger motor 576 is below a predetermined high motor performance setting 218. And, in step 1004, the compressor 536 is slowed or stopped when the amperage draw or the torque 214 of the auger motor 576 is between 234 a predetermined low motor performance setting 216, and the predetermined high motor performance setting 218.

In a plurality of exemplary embodiments, the compressor 536 can be a standard conventional compressor that can be turned 'ON' and 'OFF' or a variable speed compressor that can be turned 'ON' and 'OFF' as well as have variable speed controls to allow the compressors to be operated at different rotational speeds.

Figure 10:
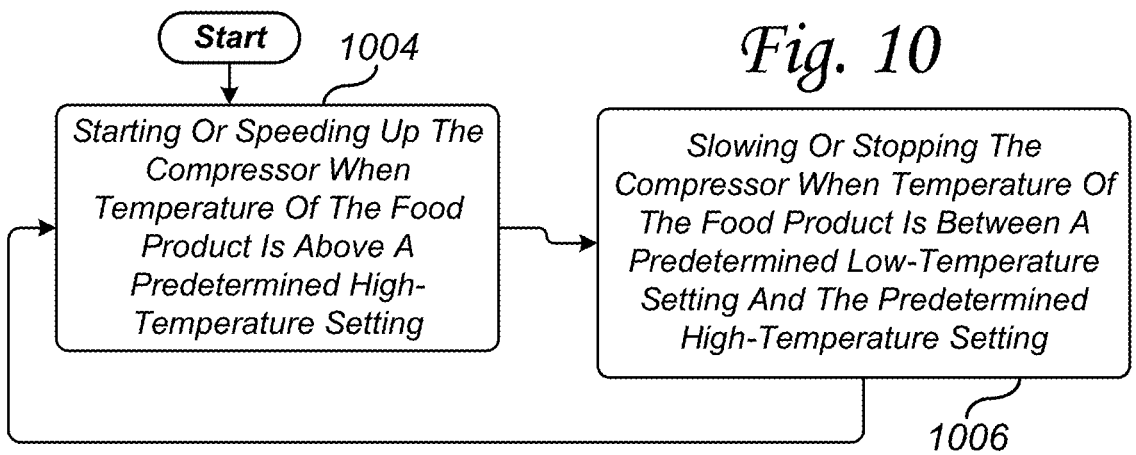

Referring to FIG. 10, there is illustrated one example of an automatic viscosity control method for frozen food products 302 dispensed from frozen beverage equipment 102 and soft-serve ice cream equipment 104. In an exemplary embodiment, the control system 500 further comprises a temperature sensor 542. The temperature sensor 542 is operationally related to the microcontroller 502 and the mixing cylinder 524. The temperature sensor 542 measures the temperature of the food product 302 inside the mixing cylinder 524. The memory 504 is encoded with instructions that when executed by the microcontroller 502 transitions between steps 1004 and 1006.

In step 1004, the compressor 536 is started or speeded up when the temperature 204 of the food product 302 is above a predetermined high-temperature setting 206. And, in step 1006, the compressor 536 is slowed or stopped when temperature 204 of the food product 302 is between 232 a predetermined low-temperature setting 208 and the predetermined high-temperature setting 206, and the amperage draw or the torque 214 of the auger motor 576 is between 234 a predetermined low motor performance setting 216 and the predetermined high motor performance setting 218.

Figure 11:
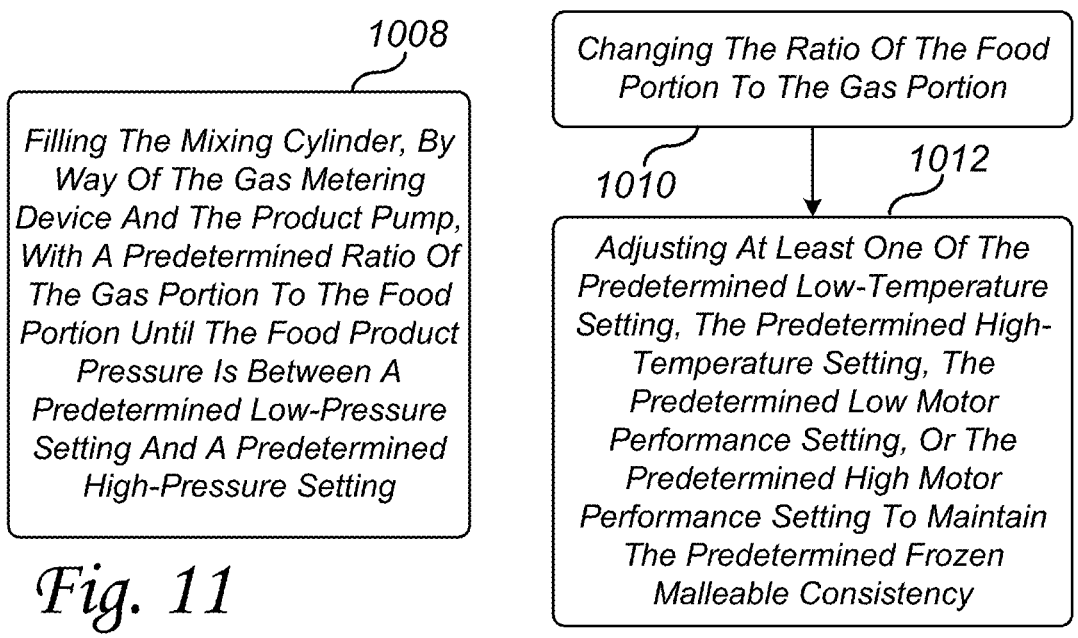

Referring to FIG. 11, there is illustrated one example of an automatic viscosity control method for frozen food products 302 dispensed from frozen beverage equipment 102 and soft-serve ice cream equipment 104. In an exemplary embodiment, a product pump 552 is operationally related to the microcontroller 502 and interconnected between the product inlet 566 and a supply of the food portion 306. A gas metering device 548 is operationally related to the microcontroller 502 and interconnected with a gas inlet 564. The mixing cylinder 524 further comprises the gas inlet 548, and the product inlet 566. A pressure sensor 520 is operationally related to the microcontroller 502. The pressure sensor 502 is configured to measure the food product 302 pressure 222 inside the mixing cylinder 524. The memory is encoded with instructions that when executed by the microcontroller 502 perform step 1008.

In step 1008, filling the mixing cylinder 524, by way of the gas metering device 548 and the product pump 552, with a predetermined ratio of the gas portion 304 to the food portion 306 until the food product pressure 222 is between 236 a predetermined low-pressure setting 226 and a predetermined high-pressure setting 224.

In an exemplary embodiment, the food product 302 can comprise a food portion 306, and a gas portion 304. The food product 302 can also comprise a water portion 308, or other dilutants as may be required and or desired in a particular embodiment. Additionally, the gas portion 304 can be air, carbon dioxide, nitrogen, or other gas. In operation, the food portion 306, gas portion 304, and water or dilutant portion 308 can be precisely ratiometrically mixed in a predetermined manner by way of the pumps 548/552/572, gas metering devices 548, and other various valves in the system. Such ratiometric mixing can be changed to control viscosity, portion dispensed control, and other factors, as may be required and or desired in a particular embodiment.

In step 1010, the ratio of the food portion 306 to the gas portion can be changed. The method then moves to step 1012.

In step 1020, at least one of the predetermined low-temperature setting, the predetermined high-temperature setting, the predetermined low motor performance setting, or the predetermined high motor performance setting can be adjusted to maintain the predetermined frozen malleable consistency. As an example, and not a limitation, a food product 302 with a food portion 306 and a gas or air portion 304 ratios of 60/40, 50/50, 40/60, or other ratios will all have different mouth feels and different customer consumption benefits at the predetermined frozen malleable consistency which can also be called the ideal consistency. To maintain the predetermined frozen malleable consistency across various food portion 304 and a gas portion 306 ratio changes at least one of the predetermined low-temperature setting, the predetermined high-temperature setting, the predetermined low motor performance setting, or the predetermined high motor performance setting can be adjusted. The present invention will then automatically maintain the desired predetermined frozen malleable consistency for the ratio of food portion 306 to gas or air portion 304.

Figure 12:
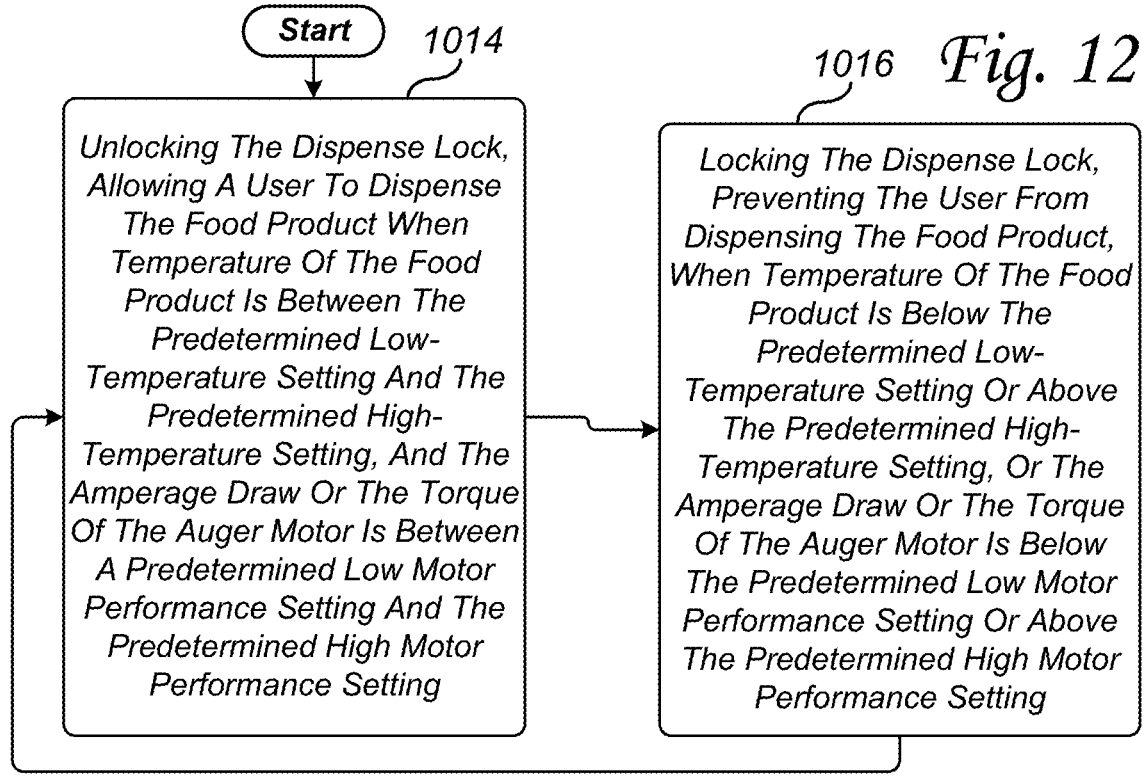

Referring to FIG. 12, there is illustrated one example of an automatic viscosity control method for frozen food products 302 dispensed from frozen beverage equipment 102 and soft-serve ice cream equipment 104. In an exemplary embodiment, a dispense lock 550/556 is operationally related to the microcontroller 502. The memory is encoded with instructions that when executed by the microcontroller 502 transition between steps 1014 and 1016.

In step 1014, the dispensing lock 550/556 is unlocked, allowing a user 402 to dispense the food product 302 when the temperature 204 of the food product 302 is between the predetermined low-temperature setting 208 and the predetermined high-temperature setting 206, and the amperage draw or the torque 214 of the auger motor 576 is between 234 a predetermined low motor performance setting 216 and the predetermined high motor performance setting 218. And, in step 1016, locking the dispensing lock 550/556, preventing the user 402 from dispensing the food product 302, when the temperature 204 of the food product 302 is below the predetermined low-temperature setting 208 or above the predetermined high-temperature setting 206, or the amperage draw or the torque 214 of the auger motor 576 is below the predetermined low motor performance setting 216 or above the predetermined high motor performance setting 218.

Figure 13:
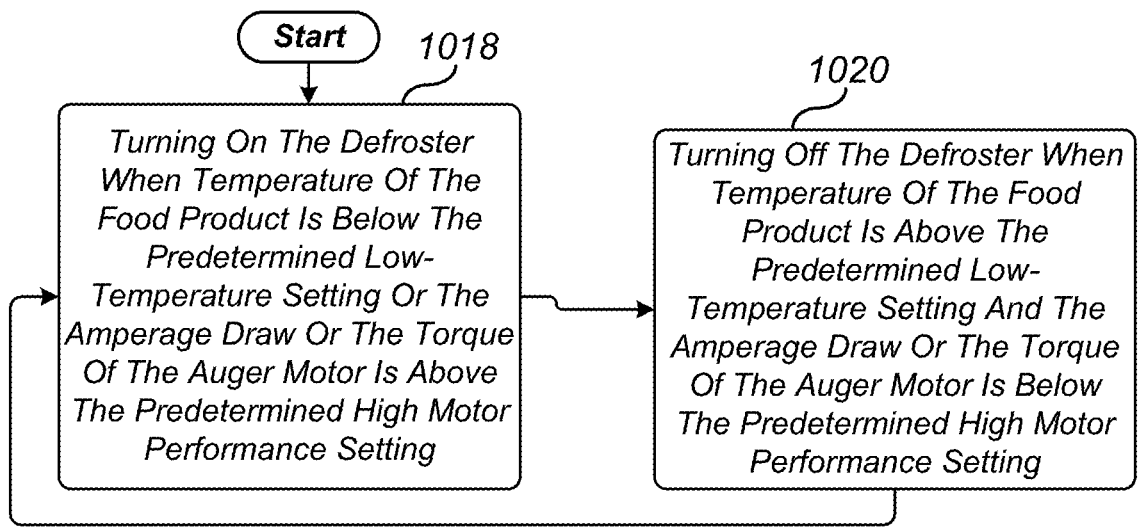

Referring to FIG. 13, there is illustrated one example of an automatic viscosity control method for frozen food products 302 dispensed from frozen beverage equipment 102 and soft-serve ice cream equipment 104. In an exemplary embodiment, a defroster 516/518 is operationally related to the microcontroller 502. The memory 504 is encoded with instructions that when executed by the microcontroller 502 transition between steps 1018 and 1020.

In step 1018, turning 'ON' the defroster 516/518 when temperature 204 of the food product 302 is below the predetermined low-temperature setting 208 or the amperage draw or the torque 214 of the auger motor 576 is above the predetermined high motor performance setting 218. And, in step 1020, turning 'OFF' the defroster 516/518 when temperature 204 of the food product 302 is above the predetermined low-temperature setting 208 and the amperage draw or the torque 214 of the auger motor 576 is below the predetermined high motor performance setting 218.

Figure 14:
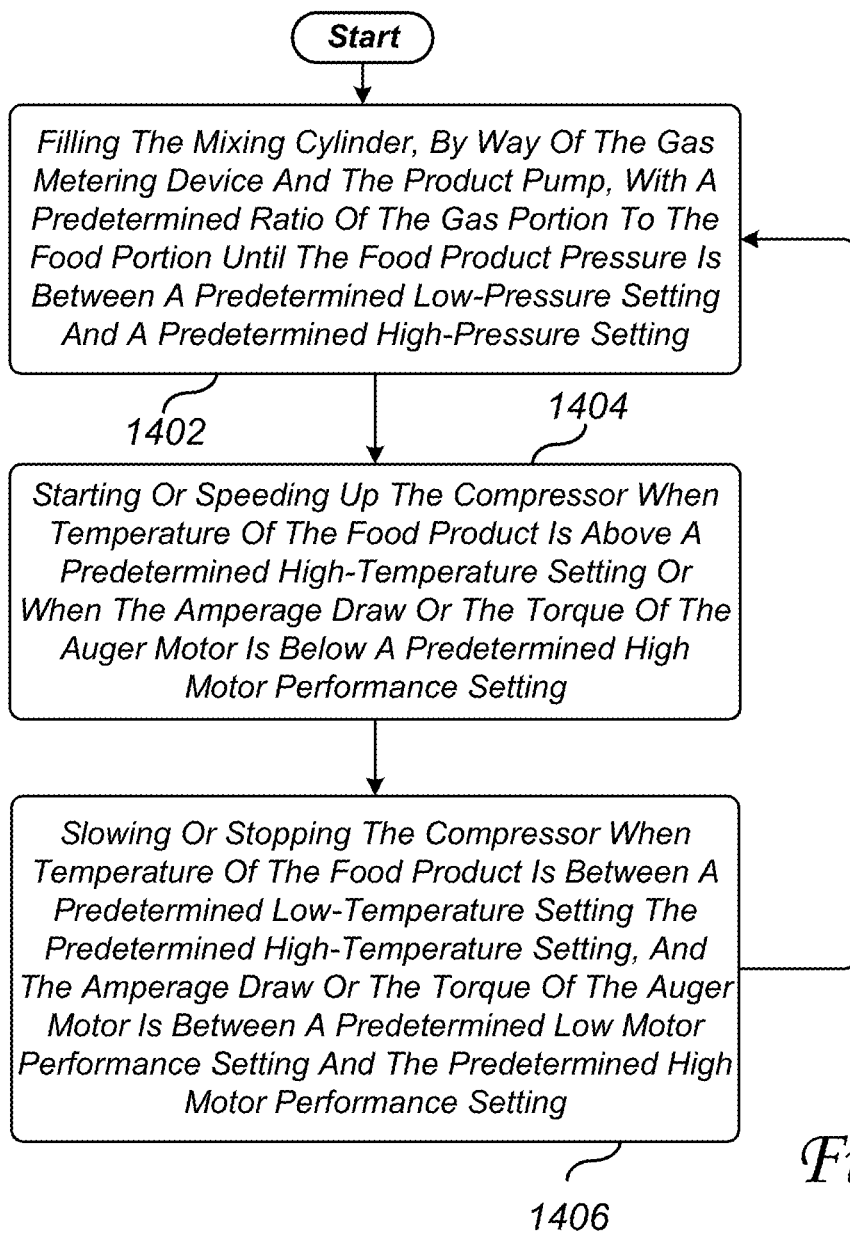

Referring to FIG. 14, there is illustrated one example of an automatic viscosity control method for frozen food products 302 dispensed from frozen beverage equipment 102 and soft-serve ice cream equipment 104. In an exemplary embodiment, an automatic viscosity control system for food products dispensed from frozen beverage equipment and soft-serve ice cream equipment can comprise a mixing cylinder 524 which comprises at least one of an auger 522, at least one of a product inlet 566 through which a food portion 306 is injected into the mixing cylinder 524, and at least one of a gas inlet 564 through which a gas portion 304 is injected into the mixing cylinder 524.

A food product 302 comprises the food portion 306 and the gas portion 304. An auger motor 576 is interconnected with the auger 522. The auger 522 is positioned inside the mixing cylinder 524.

A control system 500 comprises a microcontroller 502, and a memory 504. A motor sensor 528/530 is operationally related to the microcontroller 502 and interconnected with the auger motor 576. The motor sensor 528/530 measures an amperage draw or a torque of the auger motor 576 resultant from the resistance of rotating the auger 522 through the food product 302. A gas metering device 548 is operationally related to the microcontroller 502 and interconnected with a gas inlet 564. The mixing cylinder 524 further comprises the gas inlet 564, and the product inlet 566. A pressure sensor 520 is operationally related to the microcontroller 502. The pressure sensor 520 is configured to measure the pressure of the food product 302 inside the mixing cylinder 524.

A refrigeration system 568 comprises a compressor 536. The compressor 536 is operationally related to the microcontroller 502 and configured to chill, into the predetermined frozen malleable consistency, the food product 302 inside the mixing cylinder 524.

The memory 504 is encoded with instructions that when executed by the microcontroller 502 perform steps that begin in step 1402 by filling the mixing cylinder 524, by way of the gas metering device 548 and the product pump 552, with a predetermined ratio of the gas portion 304 to the food portion 306 until the food product pressure 222 is between 236 a predetermined low-pressure setting 226 and a predetermined high-pressure setting 224. The method then moves to step 1404.

In step 1404, the compressor 536 is started or sped up when the temperature of the food product 302 is above a predetermined high-temperature setting 208 or when the amperage draw or the torque of the auger motor 576 is below a predetermined high motor performance setting 218. The method then moves to step 1406.

In step 1406, the compressor 536 is slowed or stopped when the temperature of the food product 302 is between a predetermined low-temperature setting 206 and the predetermined high-temperature setting 208, and the amperage draw or the torque of the auger motor 576 is between a predetermined low motor performance setting 216 and the predetermined high motor performance setting 218.

Figure 15:
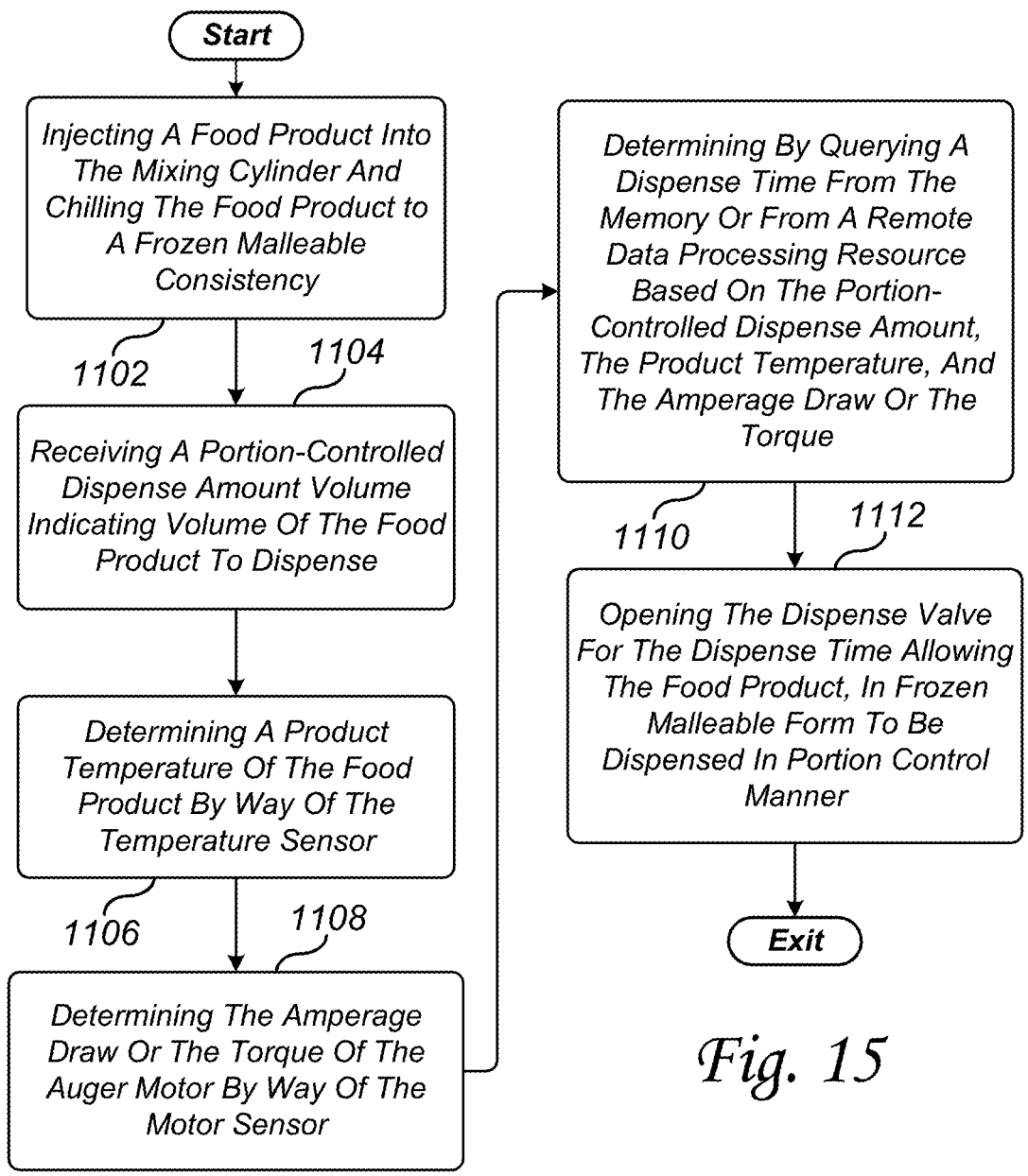
FIGS. 15-18 illustrate examples of a portion control method for food products dispensed from frozen beverage equipment and soft-serve ice cream equipment.

Referring to FIG. 15, there is illustrated one example of a portion control method for food products 302 dispensed from frozen beverage equipment 102 and soft-serve ice cream equipment 104. In an exemplary embodiment, a mixing cylinder 524 comprises at least one of an auger 522, at least one of a product inlet 566, and at least one of a dispense valve 526. An auger motor 576 is interconnected with the auger 522. The auger 522 is positioned inside the mixing cylinder 524. A control system 500 comprises a microcontroller 502, a memory 504, a temperature sensor 542, and a motor sensor 528 (torque monitoring)/530 (electrical current sensing). The temperature sensor 542 is operationally related to the mixing cylinder 524. The temperature sensor 542 measures the temperature 204 of the food product 302 inside the mixing cylinder 524. The motor sensor 528/530 is operationally related to the auger motor 576. The motor sensor 528/530 measures a torque 528 or an amperage draw 530 of the auger motor 576 resultant from the resistance of rotating the auger 522 through the food product 302. The memory 504 is encoded with instructions that when executed by the microcontroller 502 perform the following steps beginning in step 1102.

In step 1102, a food product 302 is injected into the mixing cylinder 524 and chilled to a predetermined frozen malleable consistency. The method then moves to step 1104.

In step 1104, a portion-controlled dispense amount volume indicating the volume of the food product to dispense is received, In an exemplary embodiment, the step of receiving the portion-controlled dispense amount volume is effectuated by a data communication from a point-of-sale device, a quick-serve restaurant data processing device, a customer 404 or user 402 initiated data communication from a data communication device 606, a remote data communication from the remote data processing resource 604, manual data entry by the user 402 or the customer 404 at the portion control system 500, or by other methods or techniques. The method then moves to step 1106.

In step 1106, a product temperature 204 of the food product 302 is determined by way of the temperature sensor 542. The method then moves to step 1108.

In step 1108, the amperage draw or the torque 214 of the auger motor 576 is determined by way of the motor sensor 528/530. The method then moves to step 1110.

In step 1110, a dispense time is determined by a query from the memory 504 or from a remote data processing resource 604 based on the portion-controlled dispense amount volume, the product temperature 204, and the amperage draw or the torque 214. In an exemplary embodiment, the step of determining by querying the dispense time is effectuated by way of a lookup table or a database encoded in the memory 504, the lookup table and/or the database correlates a plurality of the dispense times 210 based on a plurality of the portion-controlled dispense amounts volume, a plurality of the product temperatures 204, and a plurality of the amperage draw or the torque 214 measurements, or effectuated by other methods or techniques. The method then moves to step 1112.

In step 1112, the dispense valve 526 is opened for the dispense time allowing the food product 302, in a predetermined frozen malleable consistency, to be dispensed in a portion-controlled manner. The method is then exited.

In an exemplary embodiment, the food product 302 can comprise a food portion 306, and a gas portion 304. The food product 302 can also comprise water 308, or other dilutants as may be required and or desired in a particular embodiment. Additionally, the gas portion 304 can be air, carbon dioxide, nitrogen, or other gas. In operation, The food portion 306, gas portion 304, and water or dilutant portion 308 can be precisely ratiometrically mixed in a predetermined manner by way of the pumps 548/552/572, gas metering devices 548, and other various valves in the system. Such ratiometric mix can be changed to control viscosity, portion dispenses control, and other factors, as may be required and or desired in a particular embodiment.

Figure 16:
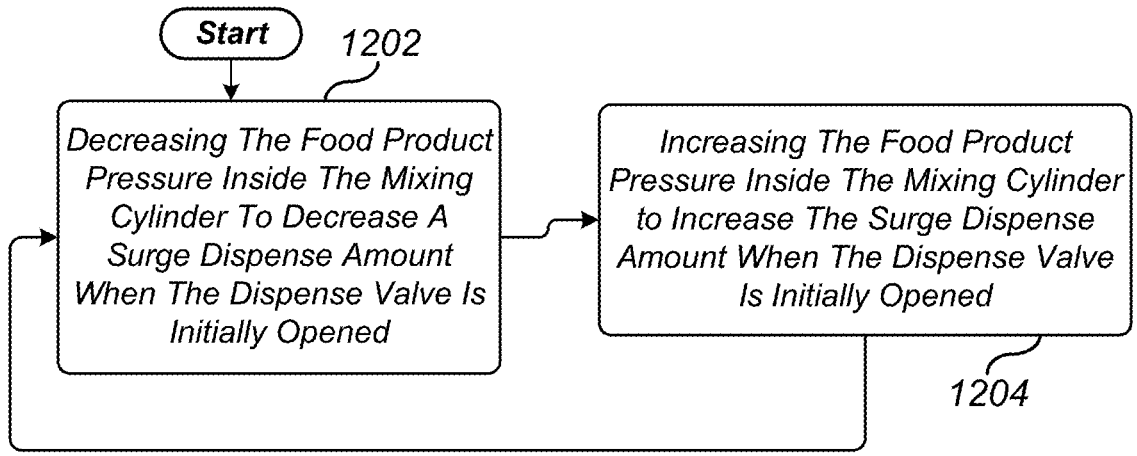

Referring to FIG. 16, there is illustrated one example of a portion control method for food products 302 dispensed from frozen beverage equipment 102 and soft-serve ice cream equipment 104. In an exemplary embodiment, a product pump 552 is operationally related to the microcontroller 502 and interconnected between the product inlet 566 and the supply of the food portion 306. A gas metering device 548 is operationally related to the microcontroller 502 and interconnected with a gas inlet 564. The mixing cylinder 524 further comprises the gas inlet 564, and the product inlet 566. A pressure sensor 520 is operationally related to the microcontroller 502. The pressure sensor 520 is configured to measure a food product pressure 222 inside the mixing cylinder 524. The memory 504 is encoded with instructions that when executed by the microcontroller 502 transition between steps 1202 and 1204.

In step 1202, decreasing the food product pressure 222 inside the mixing cylinder 524 to decrease a surge dispense amount of the food product 302 when the dispense valve 526 is initially opened. And, in step 1204, increasing the food product pressure 222 inside the mixing cylinder 524 to increase the surge dispense amount of the food product 302 when the dispense valve 526 is initially opened.

Figure 17:
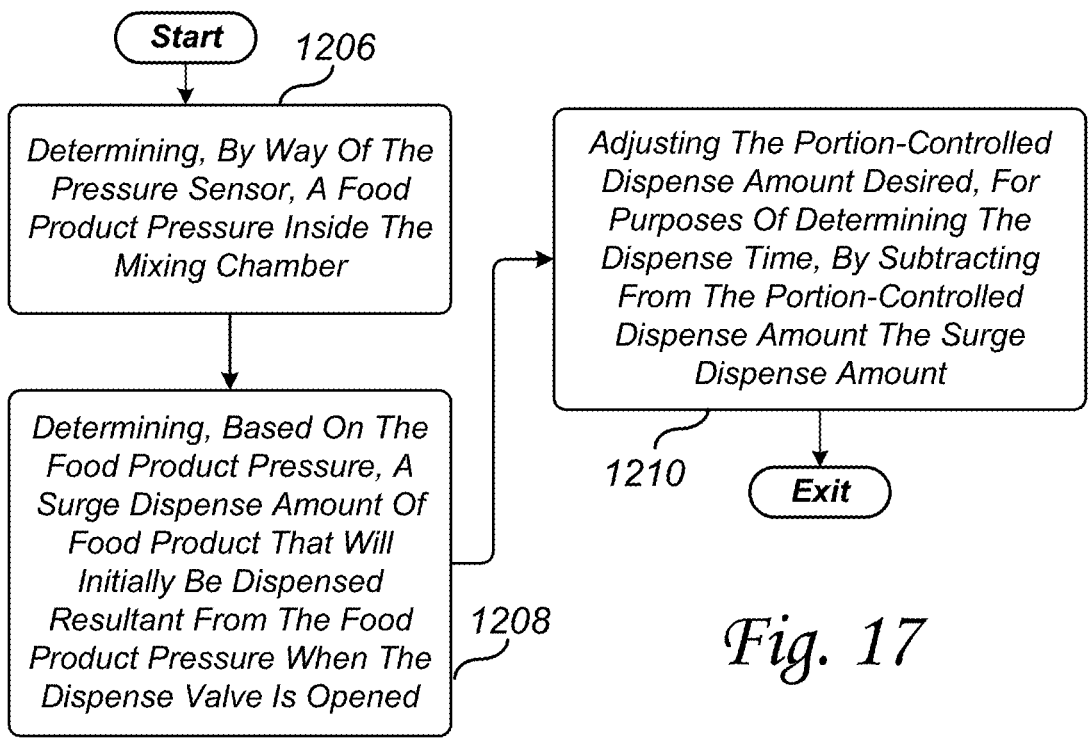

Referring to FIG. 17, there is illustrated one example of a portion control method for food products 302 dispensed from frozen beverage equipment 102 and soft-serve ice cream equipment 104. In an exemplary embodiment, a pressure sensor 520 is operationally related to the microcontroller 502. The memory 504 is encoded with instructions that when executed by the microcontroller 502 perform steps 1206, 1208, and 1210.

In step 1206, a food product pressure 222 inside the mixing chamber 524 is determined, by way of the pressure sensor 520. In an exemplary embodiment, the ratio of the gas portion 304, food portion 306, and if necessary the water portion 308 influences the food product pressure 222 when it reaches the desired predetermined frozen malleable consistency. When the dispense valve 526 is first opened the food product pressure 222 forces a surge of food product to dispense out of the dispense valve 526. When the food product pressure 222 drops it is then the auger 522 that pushes the food product 302 out of the dispense valve 526. The method then moves to step 1208.

In step 1208, a surge dispense amount of food product that will initially be dispensed resultant from the food product pressure 222 when the dispense valve is opened is determined, based on the food product pressure 222. The method then moves to step 1210.

In step 1210, the portion-controlled dispense amount volume desired is adjusted, for purposes of determining the dispense time, by subtracting from the portion-controlled dispense amount volume the surge dispense amount.

In an exemplary embodiment, the food product pressure 222 is sufficient to force a surge dispense amount of food product 302 out the dispense valve 526 when opened. Once the food product pressure 222 drops resultant from the surge dispense amount egress through the dispense valve 526 it is the auger 522 that pushes the remaining desired food portion through the dispense valve 526. In a portion-controlled application, the surge dispense amount should be subtracted from the portion-controlled dispense amount volume before the dispense time is determined to better ensure food product 302 dispense accuracy.

As an example and not a limitation, at a predetermined temperature 204, amperage draw or torque 214, and food product pressure 222 the surge dispense amount is one ounce of food product 302, and the food product dispense flow rate is two ounces per second. Therefore if the desired portion-controlled dispense amount volume is nine ounces then the adjusted portion-controlled dispense amount volume is nine ounces minus the surge dispense amount or nine ounces minus one ounce which equals eight ounces. The dispense time can then be determined by the adjusted portion-controlled dispense amount volume divided by the food product dispense flow rate or eight ounces divide by two ounces per second which equals four seconds. The dispense time is then four seconds. In a plurality of embodiments, as temperature 204, amperage draw or torque 214, and food product pressure 222 change so will the surge dispense amount, and the food product dispense flow rate. In operation, an accessible lookup table or database in memory 504 or on a remote data processing resource 604 can correlate variables that change such as temperature 204, amperage draw of torque 214, food product pressure 222, the surge dispense amount, and the food product dispense flow rate, and other variables with the desired portion-controlled dispense amount to determine a dispense time to achieve an accurate portion-controlled food product 302 dispense.

Figure 18:
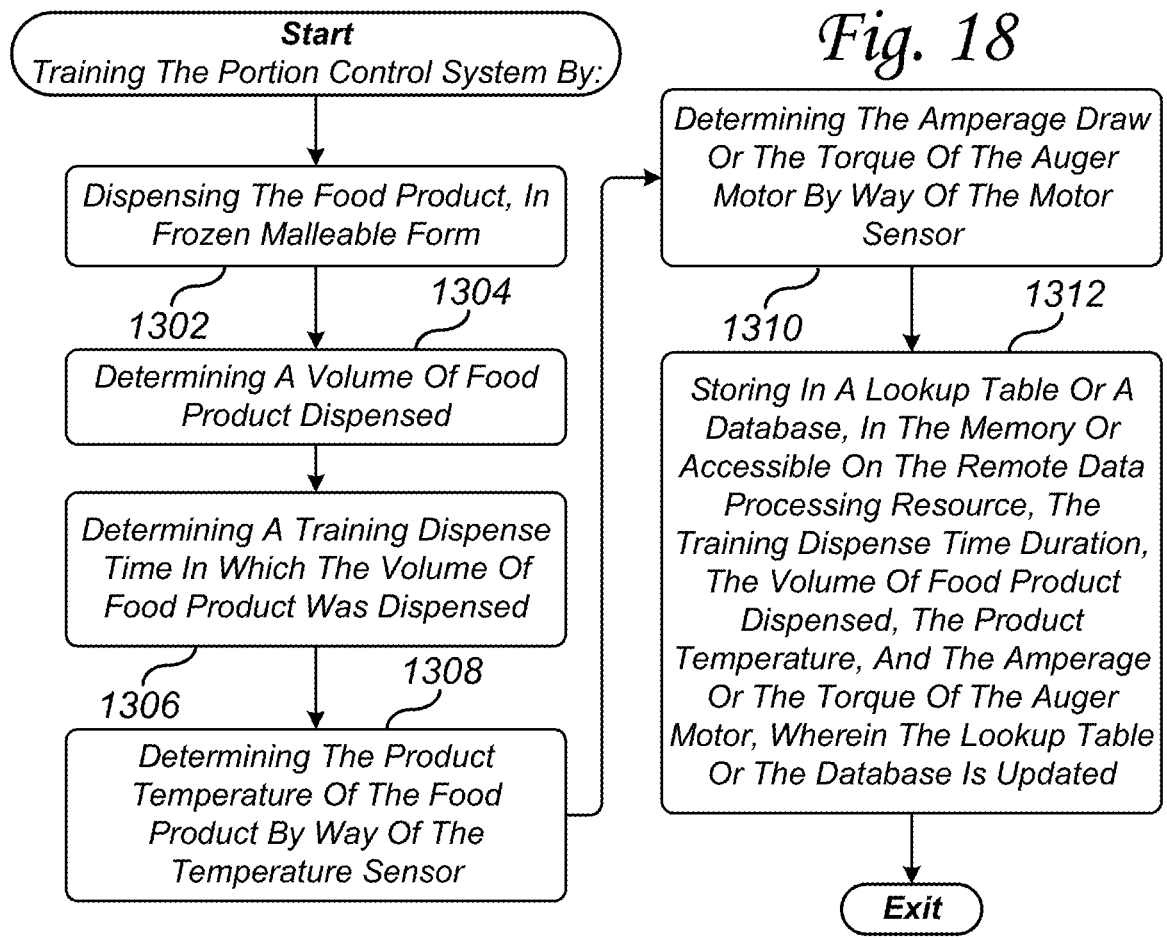

Referring to FIG. 18, there is illustrated one example of a portion control method for food products 302 dispensed from frozen beverage equipment 102 and soft-serve ice cream equipment 104. In an exemplary embodiment, the portion control system can be trained by encoding the memory 504 instructions that when executed by the microcontroller 502 performs the following step beginning in step 1302.

In step 1302, the food product 302 can be dispensed in a predetermined frozen malleable consistency form. The method then moves to step 1304.

In step 1304, the volume of food product dispensed is then determined. In this regard, since training is an iterative process, the amount of dispense can very to create an array of different data points. The method then moves to step 1306.

In step 1306, a training dispense time is determined in which the volume of food product was dispensed. In this regard, the dispense is timed so that a volume per second determination can be determined. The method then moves to step 1308.

In step 1308, the product temperature 204 of the food product is determined by way of the temperature sensor 542. The method then moves to step 1310.

In step 1310, the amperage draw or the torque 214 of the auger motor 576 can be determined by way of the motor sensor 528/530. The method then moves to step 1312.

In step 1312, storing in a lookup table or a database, in the memory 504 or accessible on the remote data processing resource 604, the training dispense time duration, the volume of food product dispensed, the product temperature 204, and the amperage or the torque 214 of the auger motor. In this regard, then during normal operational use, the lookup table or the database is updated and becomes queryable to determine the dispense time based on a desired portion-controlled dispense amount volume.

In an exemplary embodiment, the food product pressure 222 can also be correlated with other variables and stored in a lookup table or a database, in the memory 504 or accessible on the remote data processing resource 604.

Figure 19:
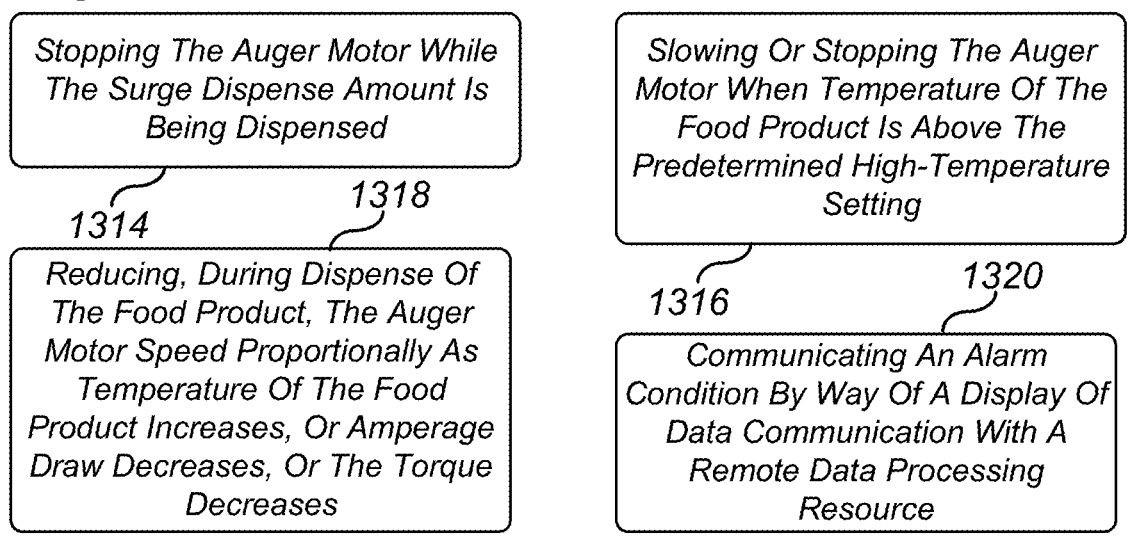
FIG. 19 illustrates exemplary embodiments utilized with the methods of the present invention.

Referring to FIG. 19, there are illustrated exemplary embodiments utilized with the methods of the present invention.

In step 1314, the auger motor 576 can be stopped while the surge dispense amount is being dispensed. In this regard, stopping the auger motor 576 and thus the auger 522 during the surge period, allows the surge amount to be predictably dispensed without the aid of the auger 522. Once the surge amount has been dispensed the auger 522 by way of the auger motor 576 can be restarted and it is then the action of the auger 522 that causes the food product 302 to be dispensed.

In step 1316, the auger motor 576 can be slowed or stopped when temperature 204 of the food product 302 is above the predetermined high-temperature setting 206.

In step 1318, reducing, during dispense of the food product 302, the auger motor speed 502 proportionally as temperature 204 of the food product 302 increases, or amperage draw 214 decreases or the torque 214 decreases. In this regard, as the viscosity of the food product decreases (thins), the auger motor 576 speed decreases to maintain a constant flow rate of the food product 302 during dispense.

In step 1320, communicating an alarm condition by way of a display 506 or data communication with a remote data processing resource 604 when a predetermined refrigeration chill period 230 elapses. The control system 500 comprises the display 506 and the display 506 is operationally related to the microcontroller 502. In this regard, the predetermined refrigeration chill period 230 is the amount of time allotted for the food product 302 reaches a predetermined frozen malleable consistency after which a problem with the frozen beverage equipment 102 and soft-serve ice cream equipment 104 can be suspected.

Figure 20:
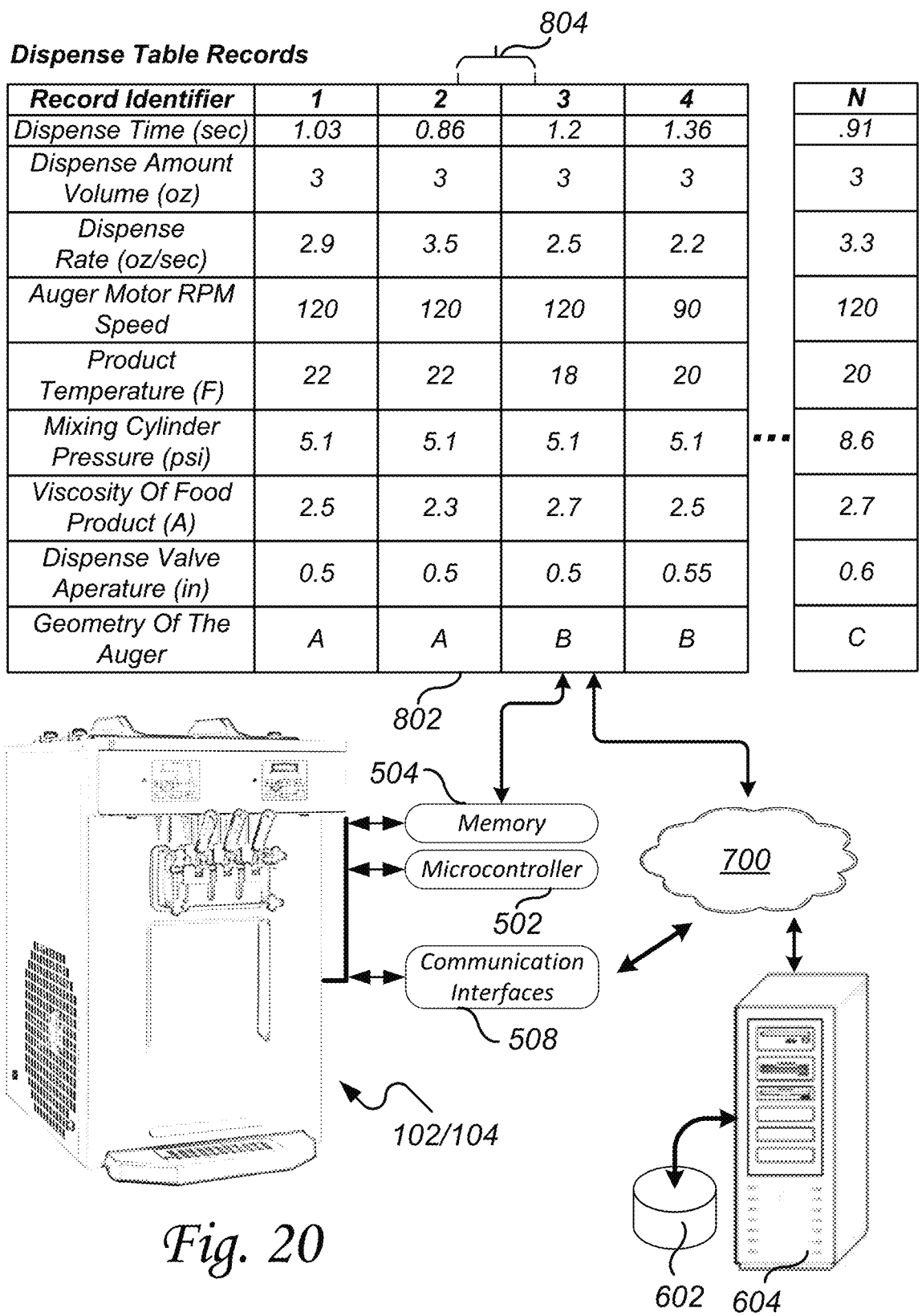
FIG. 20 illustrates one example of a network and database structure for a portion control system for food products dispensed from frozen beverage equipment and soft-serve ice cream equipment.

Referring to FIG. 20, there is illustrated one example of a network and database structure for a portion control system for food products dispensed from frozen beverage equipment and soft-serve ice cream equipment 102/104. In an exemplary embodiment, a database 602 or lookup table can comprise a plurality of dispense table records 802. Each of the dispense table records 802 is a set of dispense condition variables in which a dispense amount volume can be dispensed in a dispense time. In operation, the dispense condition variables of food product 302 pressure, temperature, viscosity, auger RPM, dispense valve aperture, the geometry in the mixing cylinder 522, and other variables all play a role in the volume of food product that can be dispensed in a dispense time.

In a portion-controlled application, in response to receiving a portion-controlled dispense amount volume for a desired food product 302, a dispense time to dispense a dispense amount volume can be determined. The dispense time is the amount of time to open the dispense valve 526 to dispense the desired dispense amount volume. The dispense amount volume of the received portion-controlled dispense amount volume.

In determining the dispense time, one or more dispense table records of similar dispense condition variables values that most closely match the current dispense condition sensor reading and similar dispense amount volumes are used. Since each variable can have an operating range, it is perhaps likely that in a system with a finite number of trained dispense table records that the exact dispense condition variables values and/or the exact dispense amount volume wouldn't exist in a single dispense table record.

An advantage, in the present invention, is that several dispense table records 802 can be used to interpolate 804 between the dispense condition variables values stored in the dispense table records 802 and the current sensor values and conditions. In this regard, responsive to virtually any received portion-controlled dispense amount volume desired across a wide range of dispense condition variables, a dispense time can be determined. This allows portion-controlled dispensing at any preferred dispense amount volume.

In operation, such interpolation 804 can be between one or more of the plurality of dispense condition variables, the dispense time, and/or the dispense amount volume. If the auger motor is 'on' and operating, a single dispense time can be used to dispense in a dispense amount volume that matches the received portion-controlled dispense amount volume. If the auger motor is in the 'off' state, a dispense time can be determined for a surge amount. The surge amount is the amount of dispense volume amount that is dispensed when dispense valve 526 is opened when the auger motor 576 is not operating and the mixing cylinder pressurized. Once the surge amount has been dispensed the remain amount of the dispense amount volume can be used to determine a final dispense time. The auger motor 576 is then started at the desired auger motor RPM speed, and the remaining dispense amount volume dispensed. The combination of the surge amount and the final dispense amount total the received a portion-controlled dispense amount volume. In other words, the final dispense amount volume is equal to the received portion-controlled dispense amount volume minus the surge amount volume.

In an exemplary embodiment, a portion control system for food products dispensed from frozen beverage equipment and soft-serve ice cream equipment comprises a mixing cylinder 524. The mixing cylinder 524 comprises at least one of an auger 522, at least one of a product inlet 564/566/574, and at least one of a dispense valve 526.

The portion control system further comprises, an auger motor 576 that is interconnected with the auger 522. The auger 522 is positioned inside the mixing cylinder 524 and rotates at an auger motor RPM speed. And, a control system 500 that comprises a microcontroller 502, a memory 504, a temperature sensor 542, a pressure sensor 520, and a motor sensor 528/530. The temperature sensor 542 is operationally related to the mixing cylinder 524 and measures a product temperature of a food product 302 inside the mixing cylinder 524. The pressure sensor 520 is operationally related to the mixing cylinder 524 and measures pressure inside the mixing cylinder 524. The motor sensor 528/530 is operationally related to the auger motor 576 and measures an amperage draw or a torque of the auger motor 576 resultant from the resistance of rotating the auger 522 through the food product 302.

In operation, the memory 504 is encoded with instructions that when executed by the microcontroller 502 perform the steps of injecting the food product 302 into the mixing cylinder 524 through the product inlet 564/566/574 and chilling the food product 302 to a predetermined frozen malleable consistency. The method continues by receiving a portion-controlled dispense amount volume indicating the volume of the food product 302 to dispense.

If initially the auger motor RPM speed is zero, the auger motor 576 is 'off', a dispense time and a dispense amount volume are determined based on the current values of a plurality of dispense condition variables by interpolating between a plurality of a dispense table record 802. The dispense table record 802 comprise a dispense time, a dispense amount, and the auger motor RPM across a range of values of the plurality of dispense condition variables where the auger motor RPM is zero. The dispense amount volume is a surge amount volume. The dispense valve is then opened for the dispense time, allowing the surge amount volume of the food product 302, in the predetermined frozen malleable consistency, to be dispensed in a portion control manner. A new dispense time and the dispense amount volume is determined. The new dispense time is determined based on current values of the plurality of dispense condition variables by interpolating between a plurality of the dispense table record. The new dispense amount volume is equal to the portion-controlled dispense amount volume minus the surge dispense amount volume already dispensed. The auger motor 576 is started rotating, and the dispense valve 526 is opened for the dispense time, allowing the dispense amount volume of the food product 302, in the predetermined frozen malleable consistency, to be dispensed in a portion control manner.

In the alternative, if initially the auger motor RPM speed is greater than zero, the auger motor 576 is 'on', the dispense time and the dispense amount volume are determined. The dispense time is determined based on current values of the plurality of dispense condition variables by interpolating between a plurality of the dispense table record. The dispense amount volume is equal to the portion-controlled dispense amount volume. The dispense valve is then opened for the dispense time, allowing the dispense amount volume of the food product 302, in the predetermined frozen malleable consistency, to be dispensed in portion control manner.

An advantage in the present invention is that during normal operation the auger motor 576 turns 'on' and 'off' to keep the food product at an optimal viscosity and frozen malleable state. The auger motor 576 may be 'on' or 'off' when a portion-controlled dispense request is received at equipment 102/104. Since speed to complete the dispense is important in quick serve restaurant environments, there is no need to change the state of the auger motor 576 'off' to 'on' in order to initiate a dispense. In this regard, regardless of the state of the auger motor 576, the present invention can determine a surge amount plus a final dispenses amount to accommodate an auger motor 576 initially 'off', then turned it 'on' to complete the dispense, or start a dispense with the auger motor 576 'on' and dispense in a manner where a surge amount does not apply.

In an exemplary embodiment, the plurality of dispense condition variables can comprise a food product viscosity, a mixing cylinder pressure, a dispense valve aperture size, a geometry of the auger, and other variables, as may be required an/or desired in a particular embodiment.

In an exemplary embodiment, the food product 302 viscosity can be determined based on the amperage draw or the torque of the auger motor 576. Additionally, the step of determining the dispense time further comprises selecting an auger motor RPM speed, and the step of starting the auger motor further comprises starting the auger motor 576 at the auger motor RPM speed.

In an exemplary embodiment, the step of receiving the portion-controlled dispense amount volume can be effectuated by way of one of the following: a data communication from a point-of-sale devices, a quick-serve restaurant data processing device which can also be referred to as a data communication device 606, a customer 404 or the user 402 initiated data communication from a digital communication device, a remote data communication from the remote data processing resource 604, or manual data entry by the user at the portion control system which is part of equipment 102/104.

Figure 21:
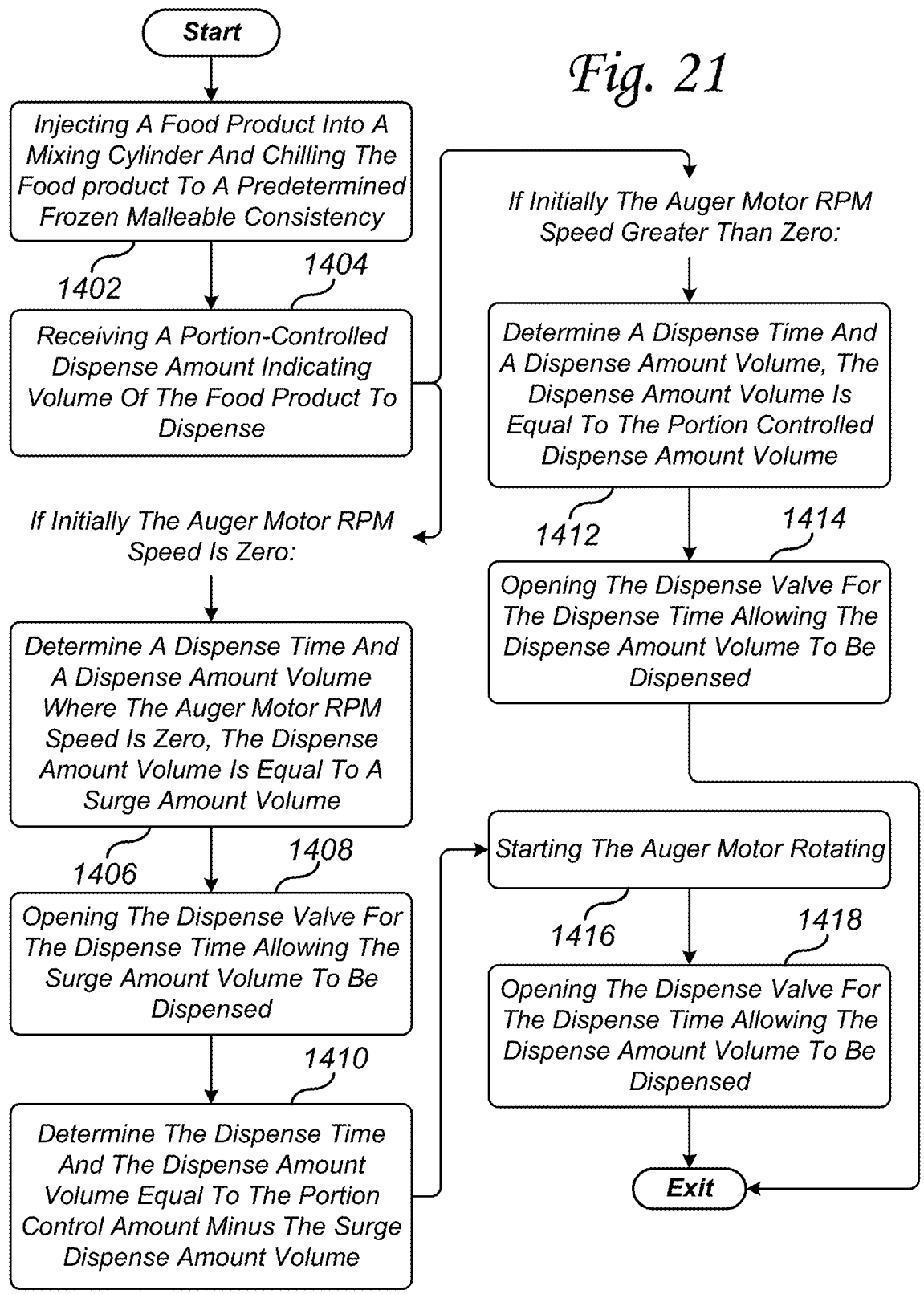
FIG. 21-22 illustrate examples of a portion control method for food products dispensed from frozen beverage equipment and soft-serve ice cream equipment.

Referring to FIG. 21 there is illustrated one example of a portion control method for food products 302 dispensed from frozen beverage equipment 102 and soft-serve ice cream equipment 104. In an exemplary embodiment, and with reference to FIG. 21, the method begins in step 1402 where a food product 302 can be injected into a mixing cylinder 524 and chilling the food product to a predetermined frozen malleable consistency. The mixing cylinder 524 comprises at least one of an auger 522, at least one of a product inlet 564/566/574, and at least one of a dispense valve 526. An auger motor 576 is interconnected with the auger 522. A control system 500 comprising a temperature sensor 542, a pressure sensor 520, and a motor sensor 528/530. The temperature sensor 542 is operationally related to the mixing cylinder 524. The temperature sensor 542 measures the temperature of the food product 302 inside the mixing cylinder 524. The pressure sensor 520 can be operationally related to the mixing cylinder 524 and measures the pressure inside the mixing cylinder 524. The auger 522 is positioned inside the mixing cylinder 524 and rotates at an auger motor RPM speed. The motor sensor 528/530 can be operationally related to the auger motor 576. The motor sensor 528/530 measures an amperage draw or a torque of the auger motor 576 resultant from the resistance of rotating the auger 522 through the food product 302. The method then moves to step 1404.

In step 1404, a portion-controlled dispense amount volume is received indicating a volume of the food product 302 to dispense. In operation, such portion-controlled dispense amount volume can be received by manual input from a user, data communication between the dispenser 102/104 and a data communicating device, or by other methods, as may be required and/or desired in a particular embodiment.

In an exemplary embodiment, the step of receiving the portion-controlled dispense amount volume can be effectuated by way of one of the following: a data communication from a point-of-sale devices, a quick-serve restaurant data processing device, a customer or the user initiated data communication from a digital communication device, a remote data communication from the remote data processing resource, or manual data entry by the user at the portion control system.

In an exemplary embodiment, a communication interface 510 is operationally related to the microcontroller 502. The control system 500 by way of the communication interface 510 data communicates with the remote data processing resource 604 in a local area network environment or a wide area network environment across a global network 700.

The method then moves to step 1406 if initially the auger motor RPM speed is zero indicated that the auger motor was 'off' when the portion-control dispense was initiated and step 1412 if initially the auger motor RPM speed is greater than zero indicating that the auger motor 576 was 'on' when the portion-control dispense was initiated.

With the portion-control dispense initiated when the auger motor 576 was 'off', the auger motor RPM speed equals zero, in step 1406, a dispense time and a dispense amount volume are determined. The dispense time is determined based on current values of a plurality of dispense condition variables by interpolating 804 between plurality of a dispense table record 802. The dispense table records 802 comprise a dispense time, a dispense amount, and the auger motor RPM across a range of values of the plurality of dispense condition variables stored in more than one of the dispense table records 802 where the auger motor RPM is zero indicating the record is for a plurality of dispense condition variables in which the auger motor 576 was 'off'. In this step the dispense amount volume is a surge amount of volume. Such a surge amount volume is the amount of food product 302 dispenses when the auger motor 576 is 'off' and the dispense valve 526 is opened. It is the pressure inside the mixing cylinder that causes the food product 302 to surge out of the dispense valve 526 when opened.

In an exemplary embodiment, the plurality of dispense condition variables can comprise a food product viscosity, a mixing cylinder pressure, a dispense valve aperture size, and a geometry of the auger. Additionally, determining the food product viscosity can be based on the amperage draw or the torque of the auger motor 576. The method then moves to step 1408.

In step 1408, the dispense valve 526 is opened for the dispense time, allowing the surge amount of volume of the food product 302, in the predetermined frozen malleable consistency, to be dispensed in a portion-controlled manner.

In an exemplary embodiment, the step of opening the dispense valve, such as in step 1408, 1414, 1418, and other steps in the present invention, for the dispense time further comprise the step of maintaining constant pressure within the mixing cylinder 524 by varying amount of the food product 302 that is injected into the mixing cylinder 524 during the dispense time. The method then moves to step 1410.

In step 1410, the dispense time and the dispense amount volume is determined again. The dispense time is determined based on current values of the plurality of dispense condition variables by interpolating 804 between the plurality of the dispense table record 802. The dispense amount volume this time is equal to the original portion-controlled dispense amount volume requested minus the surge dispense amount volume already dispensed. The method then moves to step 1416.

In step 1416, the auger motor is started rotating. In an exemplary embodiment, the step of determining the dispense time can further comprise selecting an auger motor RPM speed, and the step of starting the auger motor can further comprise starting the auger motor at the auger motor RPM speed. The method then moves to step 1418.

In step 1418, the dispense valve is opened for the dispense time, allowing the dispense amount volume of the food product 302, in the predetermined frozen malleable consistency, to be dispensed in a portion control manner. The method is then exited.

With the portion-control dispense initiated when the auger motor 576 was 'on', the auger motor RPM speed is greater than zero, in step 1412, the dispense time and the dispense amount volume are determined. The dispense time is determined based on current values of the plurality of dispense condition variables by interpolating 804 between plurality of the dispense table record 802, The dispense amount volume is equal to the portion-controlled dispense amount volume. The method then moves to step 1414.

In step 1414, the dispense valve is opened for the dispense time, allowing the dispense amount volume of the food product 302, in the predetermined frozen malleable consistency, to be dispensed in portion control manner. The method is then exited.

Figure 22:
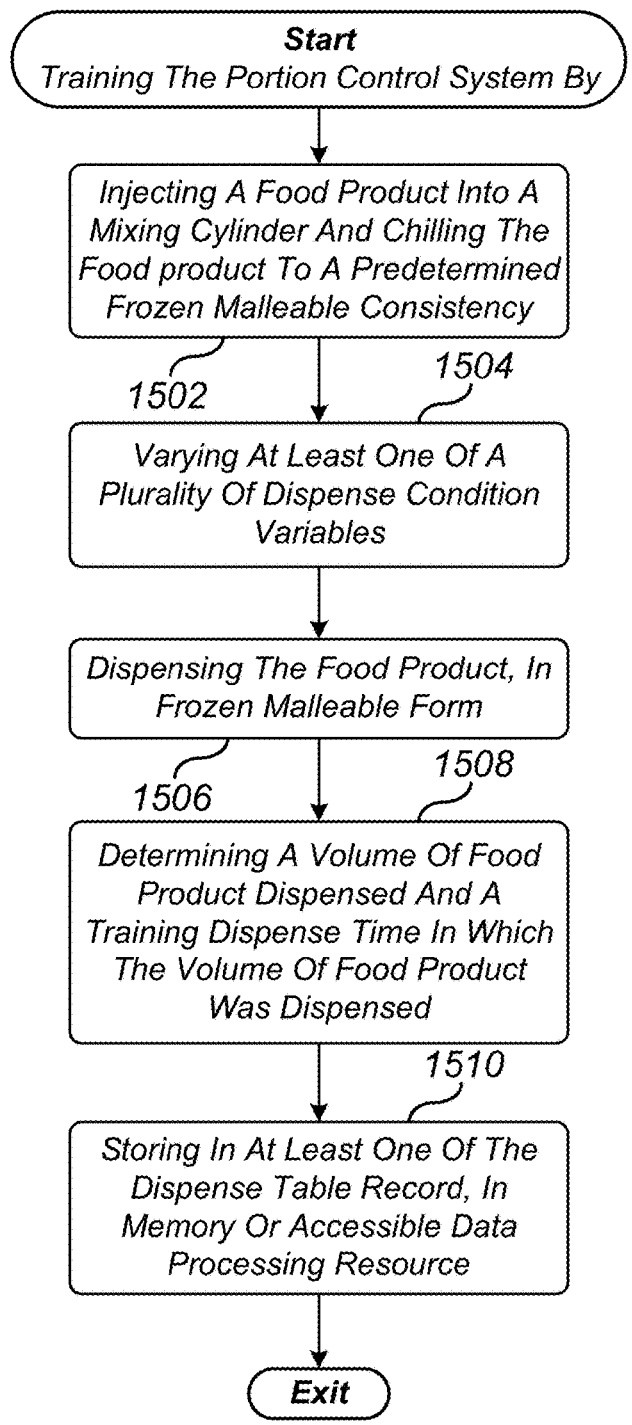

Referring to FIG. 22 there is illustrated one example of a portion control method for food products 302 dispensed from frozen beverage equipment 102 and soft-serve ice cream equipment 104. In an exemplary embodiment, the method begins in step 1502 where the portion control system is trained by varying dispense condition and created a plurality of dispense tables record of dispense time and dispense amounts volume based on those dispense conditions.

In this regard, a food product 302 can be injected into a mixing cylinder and chilling the food product to a predetermined frozen malleable consistency, the mixing cylinder comprising at least one of an auger 522, at least one of a product inlet 564/566/574, and at least one of a dispense valve 526. An auger motor 576 is interconnected with the auger 522. A control system 500 can comprise a memory 504, a temperature sensor 542, a pressure sensor 520, and a motor sensor 528/530. The temperature sensor 542 can be operationally related to the mixing cylinder 524. The temperature sensor 542 measures the temperature of the food product 302 inside the mixing cylinder 524. The pressure sensor 520 can be operationally related to the mixing cylinder 524 and measures pressure inside the mixing cylinder 524. The auger 522 is positioned inside the mixing cylinder 524 and rotates at an auger motor RPM speed. The motor sensor 528/530 can be operationally related to the auger motor 576. The motor sensor 528/530 measures an amperage draw or a torque of the auger motor resultant from resistance of rotating the auger 522 through the food product 302. The method then moves to step 1504.

In step 1504, at least one of a plurality of dispense condition variables is varied. The plurality of dispense condition variables comprise a dispense time, a dispense amount volume, a food product viscosity, a mixing cylinder pressure, a dispense valve aperture size, a geometry of the auger, and an auger motor RPM speed. The method then moves to step 1506.

In step 1506, the food product 302 is dispensed in the predetermined frozen malleable consistency form. The method then moves to step 1508.

In step 1508, a volume of food product 302 dispensed and a training dispense time in which the volume of food product was dispensed is determined. The method then moves to step 1510.

In step 1510, stored in at least one of the dispense table records which can be in the memory or accessible to the dispenser 102/104 on a remote data processing resource are the training dispense time duration as the dispense time, the volume of food product dispensed as the dispense amount volume, the product temperature, the mixing cylinder pressure, the auger motor RPM speed, and a food product viscosity based in part on an amperage draw or a torque of the auger motor. In this regard, the dispense table record is updated. The method is then exited or the plurality of dispense condition variables varied and the test rerun to create additional dispense table records.

Figure 23:
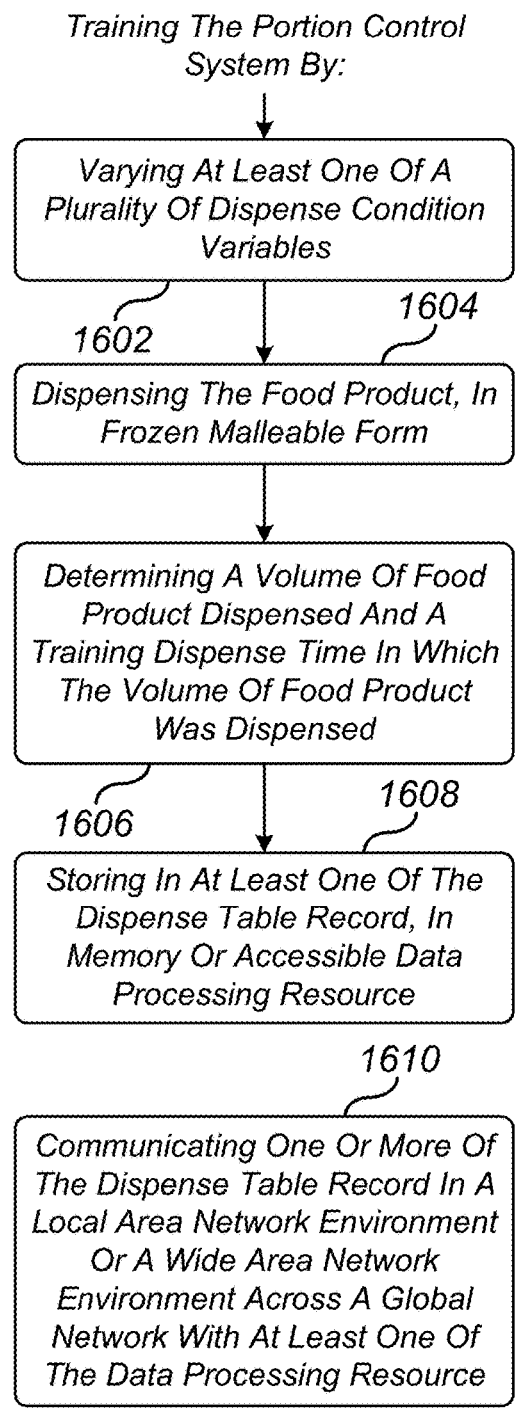
FIG. 23-24 illustrate examples of exemplary embodiments that can be interchangeably used with the methods of the present invention.
Figure 24:
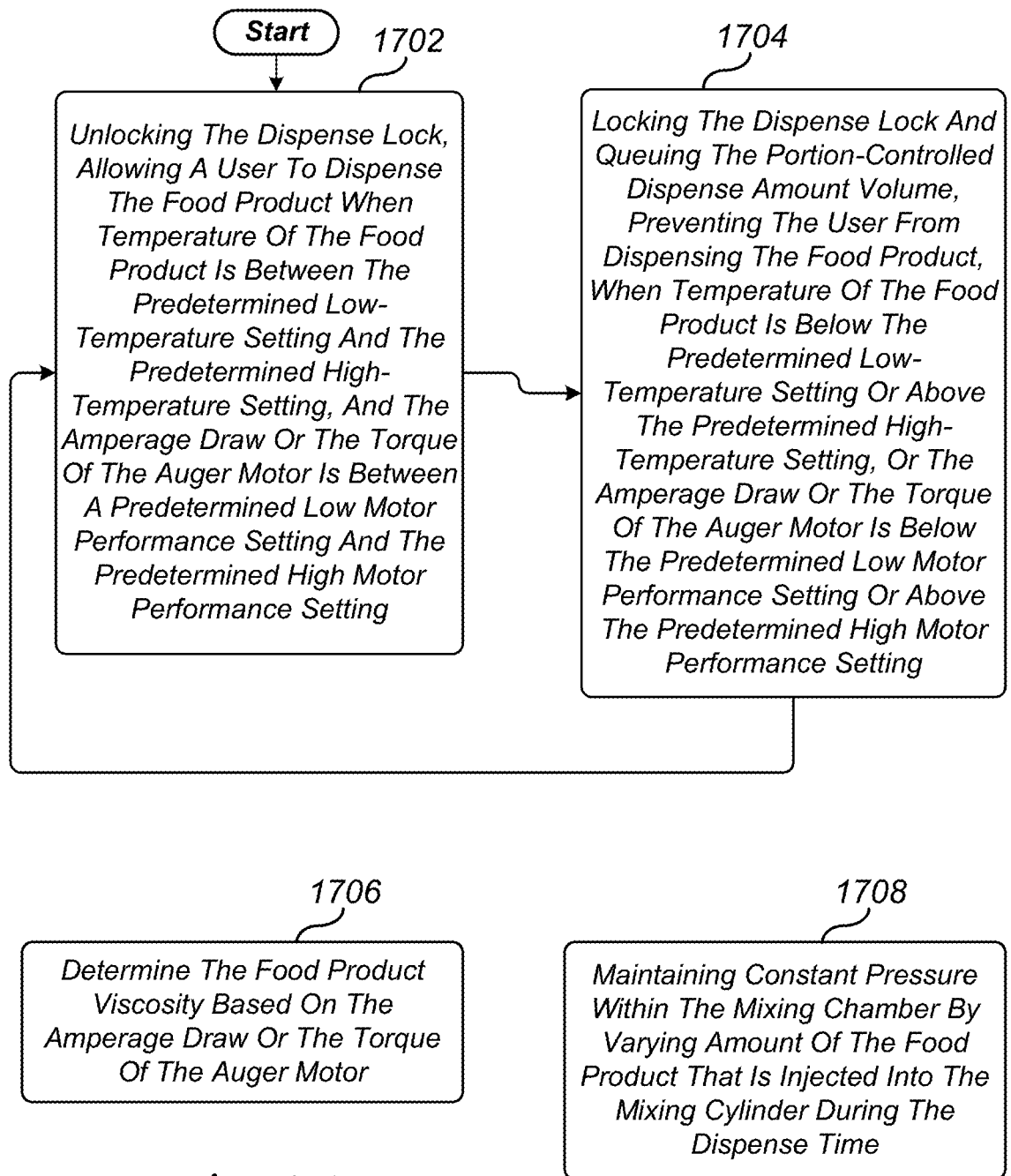

Referring to FIGS. 23 and 24, there are illustrated examples of exemplary embodiments that can be interchangeably used with the methods of the present invention In step 1602, at least one of a plurality of dispense condition variables is varied. The plurality of dispense condition variables comprise a dispense time, a dispense amount volume, a food product viscosity, a mixing cylinder pressure, a dispense valve aperture size, a geometry of the auger, and an auger motor RPM speed. The method then moves to step 1604.

In step 1604, the food product 302 is dispensed in the predetermined frozen malleable consistency form. The method then moves to step 1606.

In step 1606, a volume of food product 302 dispensed and a training dispense time in which the volume of food product was dispensed is determined. The method then moves to step 1608.

In step 1608, stored in at least one of the dispense table records which can be in the memory or accessible to the dispenser 102/104 on a remote data processing resource are the training dispense time duration as the dispense time, the volume of food product dispensed as the dispense amount volume, the product temperature, the mixing cylinder pressure, the auger motor RPM speed, and a food product viscosity based in part on an amperage draw or a torque of the auger motor. In this regard, the dispense table record is updated.

In step 1610, one or more of the dispense table record data communicated in a local area network environment or a wide area network environment across a global network with at least one of the data processing resource.

With reference to FIG. 24, in step 1702, the dispensing lock 550/556 is unlocked, allowing a user 402 to dispense the food product 302 when the temperature 204 of the food product 302 is between the predetermined low-temperature setting 208 and the predetermined high-temperature setting 206, and the amperage draw or the torque 214 of the auger motor 576 is between 234 a predetermined low motor performance setting 216 and the predetermined high motor performance setting 218. And, in step 1704, locking the dispensing lock 550/556, and queuing the portion-controlled dispense amount, preventing the user 402 from dispensing the food product 302, when the temperature 204 of the food product 302 is below the predetermined low-temperature setting 208 or above the predetermined high-temperature setting 206, or the amperage draw or the torque 214 of the auger motor 576 is below the predetermined low motor performance setting 216 or above the predetermined high motor performance setting 218.

In step 1706, the food product 302 viscosity is determined based on the amperage draw or the torque of the auger motor 576.

In step 1708, constant pressure is maintained within the mixing cylinder 524 by varying amount of the food product 302 that is injected into the mixing cylinder 524 during the dispense time.

The capabilities of the present invention can be implemented in software, firmware, hardware, or some combination thereof.

As one example, one or more aspects of the present invention can be included in an article of manufacture (e.g., one or more computer program products) having, for instance, computer usable media. The media has embodied therein, for instance, computer-readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

While the preferred embodiment of the invention has been described, it will be understood that those skilled in the art, both now and in the future, may make various improvements and enhancements which fall within the scope of the claims which follow. These claims should be construed to maintain the proper protection for the invention first described.

What is claimed is:

1. A portion control system for food products dispensed from frozen beverage equipment and soft-serve ice cream equipment comprising:
   a mixing cylinder comprising an auger, a product inlet, and a dispense valve;
   an auger motor interconnected with the auger, the auger is positioned inside the mixing cylinder and rotates at an auger motor RPM speed; and
   a control system comprising a microcontroller, a memory, a temperature sensor, a pressure sensor, and a motor sensor, wherein the temperature sensor is operationally related to the mixing cylinder and measures a product temperature of a food product inside the mixing cylinder, the pressure sensor is operationally related to the mixing cylinder and measures pressure inside the mixing cylinder, the motor sensor is operationally related to the auger motor and measures an amperage draw or a torque of the auger motor resultant from resistance of rotating the auger through the food product, and the memory is encoded with instructions that when executed by the microcontroller perform the steps of:
      injecting the food product into the mixing cylinder through the product inlet and chilling the food product to a predetermined frozen malleable consistency;
      receiving a portion-controlled dispense amount volume indicating volume of the food product to dispense;
      if the auger motor RPM speed is zero:
         determining a dispense time and a dispense amount volume based on current values of a plurality of dispense condition variables by interpolating between a plurality of a dispense table record, the dispense table record comprises a dispense time, a dispense amount, and the auger motor RPM speed across a range of values of the plurality of dispense condition variables where the auger motor RPM speed is zero, the dispense amount volume is a surge amount volume;
         opening the dispense valve for the dispense time, allowing the surge amount volume of the food product to be dispensed in the predetermined frozen malleable consistency;
         determining the dispense time and the dispense amount volume, the dispense time is determined based on current values of the plurality of dispense condition variables by interpolating between the plurality of the dispense table record, the dispense amount volume is equal to the portion-controlled dispense amount volume minus the surge amount volume;
         starting the auger motor rotating; and
         opening the dispense valve for the dispense time, allowing the dispense amount volume of the food product to be dispensed in the predetermined frozen malleable consistency;
      if the auger motor RPM speed is greater than zero:
         determining the dispense time and the dispense amount volume, the dispense time is determined based on current values of the plurality of dispense condition variables by interpolating between the plurality of the dispense table record, the dispense amount volume is equal to the portion-controlled dispense amount volume; and
         opening the dispense valve for the dispense time, allowing the dispense amount volume of the food product to be dispensed in the predetermined frozen malleable consistency.

2. The portion control system in accordance with claim 1, the plurality of dispense condition variables comprises a food product viscosity, a mixing cylinder pressure, a dispense valve aperture size, and a geometry of the auger.

3. The portion control system in accordance with claim 2, further comprising the step of:
   determining the food product viscosity based on the amperage draw or the torque of the auger motor, the determined viscosity being used as one of the dispense condition variables in subsequent determinations of dispense time and dispense amount volume.

4. The portion control system in accordance with claim 1, wherein the step of determining the dispense time further comprises selecting a desired auger motor RPM speed for the portion-controlled dispense amount volume desired when the auger motor RPM speed is zero, and the step of starting the auger motor further comprises starting the auger motor at the desired auger motor RPM speed.

5. The portion control system in accordance with claim 1, wherein the step of receiving the portion-controlled dispense amount volume is effectuated by way of one of the following: data communication from a point-of-sale devices, a customer or a user initiated data communication from a data communicating device selected from a group consisting of a smartphone, a tablet, and a laptop, a remote data communication from a remote data processing resource selected from a group consisting of a server, and a network appliance, and manual data entry by the user at the portion control system.

6. The portion control system in accordance with claim 1, wherein constant pressure is maintained within the mixing cylinder by varying amount of the food product that is injected into the mixing cylinder when the dispense valve is open.

7. The portion control system in accordance with claim 1, wherein the food product further comprising a food portion, and a gas portion.

8. The portion control system in accordance with claim 7, wherein the gas portion is at least one of the following: air, carbon dioxide, and nitrogen.

9. The portion control system in accordance with claim 1, further comprising:
a user interface which comprises at least one of the following: a display, the display with touch capabilities, and a communication interface configured to data communicate with a data communicating device selected from a group consisting of a smartphone, a tablet, and a laptop, wherein the user interface is operationally related to the microcontroller, so that a user or a customer can enter the portion-controlled dispense amount volume by way of the user interface.

10. The portion control system in accordance with claim 1, further comprising:
a communication interface operationally related to the microcontroller, wherein the control system by way of the communication interface data communicates with a remote data processing resource selected from a group consisting of a server, and a network appliance, in a local area network environment or a wide area network environment across a global network.

11. The portion control system in accordance with claim 1, wherein the memory is encoded with instructions that when executed by the microcontroller perform the steps of:
training the portion control system by:
varying at least one of the plurality of dispense condition variables, the plurality of dispense condition variables comprise a food product viscosity, a mixing cylinder pressure, a dispense valve aperture size, and a geometry of the auger;
dispensing the food product in the predetermined frozen malleable consistency form;
determining a volume of food product dispensed and a training dispense time in which the volume of food product was dispensed;
storing in at least one of the dispense table record, in the memory or accessible on a remote data processing resource selected from a group consisting of a server, and a network appliance, the training dispense time duration as the dispense time, the volume of food product dispensed as the dispense amount volume, the product temperature, the mixing cylinder pressure, the auger motor RPM speed, and a food product viscosity based in part on an amperage draw or a torque of the auger motor, wherein the dispense table record is updated.

12. The portion control system in accordance with claim 1, further comprising:
a dispense lock operationally related to the microcontroller, wherein the memory is encoded with instructions that when executed by the microcontroller performs the steps of:
unlocking the dispense lock, allowing the food product to be dispensed, when temperature of the food product is between a predetermined low-temperature setting and a predetermined high-temperature setting, and the amperage draw or the torque of the auger motor is between a predetermined low motor performance setting and a predetermined high motor performance setting; and
locking the dispense lock, preventing the food product from being dispensed, when temperature of the food product is below the predetermined low-temperature setting or above the predetermined high-temperature setting, or the amperage draw or the torque of the auger motor is below the predetermined low motor performance setting or above the predetermined high motor performance setting.

13. A portion control method for food products dispensed from frozen beverage equipment and soft-serve ice cream equipment, the portion control method comprising the steps of:
injecting a food product into a mixing cylinder and chilling the food product to a predetermined frozen malleable consistency, the mixing cylinder comprising an auger, a product inlet, and a dispense valve, an auger motor interconnected with the auger, and a control system comprising a temperature sensor, a pressure sensor, and a motor sensor, wherein the temperature sensor is operationally related to the mixing cylinder, the temperature sensor measures the temperature of the food product inside the mixing cylinder, the pressure sensor is operationally related to the mixing cylinder and measures pressure inside the mixing cylinder, and the auger is positioned inside the mixing cylinder and rotates at an auger motor RPM speed, wherein the motor sensor is operationally related to the auger motor, the motor sensor measures an amperage draw or a torque of the auger motor resultant from resistance of rotating the auger through the food product;
receiving a portion-controlled dispense amount volume indicating volume of the food product to dispense;
if the auger motor RPM speed is zero:
determining a dispense time and a dispense amount volume, the dispense time is determined based on current values of a plurality of dispense condition variables by interpolating between a plurality of a dispense table record, the dispense table record comprising a dispense time, a dispense amount, and the auger motor RPM speed across a range of values of the plurality of dispense condition variables where the auger motor RPM speed is zero, wherein the dispense amount volume is a surge amount of volume;
opening the dispense valve for the dispense time, allowing the surge amount of volume of the food product to be dispensed in the predetermined frozen malleable consistency;
determining the dispense time and the dispense amount volume, the dispense time is determined based on current values of the plurality of dispense condition variables by interpolating between the plurality of the dispense table records, and the dispense amount volume is equal to the portion-controlled dispense amount volume minus the surge amount volume;
starting the auger motor rotating; and
opening the dispense valve for the dispense time, allowing the dispense amount volume of the food product to be dispensed in the predetermined frozen malleable consistency;
if the auger motor RPM speed is greater than zero:
determining the dispense time and the dispense amount volume, wherein the dispense time is determined based on current values of the plurality of dispense condition variables by interpolating between the plurality of the dispense table record, wherein the dispense amount volume is equal to the portion-controlled dispense amount volume; and opening the dispense valve for the dispense time, allowing the dispense amount volume of the food product to be dispensed in the predetermined frozen malleable consistency.

14. The portion control method in accordance with claim 13, the plurality of dispense condition variables comprises a food product viscosity, a mixing cylinder pressure, a dispense valve aperture size, and geometry of the auger.

15. The portion control method in accordance with claim 14, further comprising the step of:

determining the food product viscosity based on the amperage draw or the torque of the auger motor, the determined viscosity being used as one of the dispense condition variables in subsequent determinations of dispense time and dispense amount volume.

16. The portion control method in accordance with claim 13, wherein the step of determining the dispense time further comprises selecting a desired auger motor RPM speed, for the portion-controlled dispense amount volume when the auger motor RPM speed is zero, and the step of starting the auger motor further comprises starting the auger motor at the desired auger motor RPM speed.

17. The portion control method in accordance with claim 13, wherein the step of receiving the portion-controlled dispense amount volume is effectuated by way of one of the following: data communication from a point-of-sale devices, a customer or a user initiated data communication from a data communicating device selected from a group consisting of a smartphone, a tablet, and a laptop, a remote data communication from a remote data processing resource selected from a group consisting of a server, and a network appliance, and manual data entry by the user at the portion control system.

18. The portion control method in accordance with claim 13, wherein constant pressure is maintained within the mixing cylinder by varying amount of the food product that is injected into the mixing cylinder when the dispense valve is open.

19. The portion control method in accordance with claim 13, further comprising the step of:

training the portion control system by:

varying at least one of the plurality of dispense condition variables, the plurality of dispense condition variables comprising a food product viscosity, a mixing cylinder pressure, a dispense valve aperture size, and a geometry of the auger;

dispensing the food product in the predetermined frozen malleable consistency form;

determining a volume of food product dispensed and a training dispense time in which the volume of food product was dispensed;

storing in at least one of the dispense table record, in the memory or accessible on a remote data processing resource selected from a group consisting of a server, and a network appliance, the training dispense time duration as the dispense time, the volume of food product dispensed as the dispense amount volume, the product temperature, the mixing cylinder pressure, the auger motor RPM speed, and a food product viscosity based in part on an amperage draw or a torque of the auger motor, wherein the dispense table record is updated.

20. The portion control method in accordance with claim 13, further comprising the steps of:

unlocking a dispense lock, allowing the food product to be dispensed, when temperature of the food product is between a predetermined low-temperature setting and a predetermined high-temperature setting, and the amperage draw or the torque of the auger motor is between a predetermined low motor performance setting and a predetermined high motor performance setting, wherein the dispense lock is operationally related to the microcontroller; and locking the dispense lock, preventing the food product from being dispensed, when temperature of the food product is below the predetermined low-temperature setting or above the predetermined high-temperature setting, or the amperage draw or the torque of the auger motor is below the predetermined low motor performance setting or above the predetermined high motor performance setting.

21. A portion control method for food products dispensed from frozen beverage equipment and soft-serve ice cream equipment, the portion control method comprising the steps of:

training a portion control system by:

injecting a food product into a mixing cylinder and chilling the food product to a predetermined frozen malleable consistency, the mixing cylinder comprising an auger, a product inlet, and at least one of a dispense valve, an auger motor interconnected with the auger, and a control system comprising a memory, a temperature sensor, a pressure sensor, and a motor sensor, wherein the temperature sensor is operationally related to the mixing cylinder, the temperature sensor measures the temperature of the food product inside the mixing cylinder, the pressure sensor is operationally related to the mixing cylinder and measures pressure inside the mixing cylinder, the auger is positioned inside the mixing cylinder and rotates at an auger motor RPM speed, the motor sensor is operationally related to the auger motor, the motor sensor measures an amperage draw or a torque of the auger motor resultant from resistance of rotating the auger through the food product;

varying at least one of a plurality of dispense condition variables, the plurality of dispense condition variables comprising a dispense time, a dispense amount volume, a food product viscosity, a mixing cylinder pressure, a dispense valve aperture size, a geometry of the auger, and an auger motor RPM speed;

dispensing the food product in the predetermined frozen malleable consistency form;

determining a volume of food product dispensed and a training dispense time in which the volume of food product was dispensed;

storing in at least one of the dispense table record, in the memory or accessible on a remote data processing resource selected from a group consisting of a server, and a network appliance, the training dispense time duration as the dispense time, the volume of food product dispensed as the dispense amount volume, the product temperature, the mixing cylinder pressure, the auger motor RPM speed, and the food product viscosity calculated based in part on the amperage draw or the torque of the auger motor, wherein the dispense table record is updated.

22. The portion control method in accordance with claim 21, further comprising the step of:

communicating of the at least one dispense table record in a local area network environment or a wide area network environment across a global network with the remote data processing resource.

* * * * *